(12) United States Patent
Bando

(10) Patent No.: US 7,464,683 B2
(45) Date of Patent: Dec. 16, 2008

(54) RECIPROCATING ENGINE

(75) Inventor: Shigeru Bando, Tokushima (JP)

(73) Assignee: Bando Kiko Co., Ltd., Tokushima-shi (JP)

( * ) Notice: Subject to any disclaimer, the term of this patent is extended or adjusted under 35 U.S.C. 154(b) by 46 days.

(21) Appl. No.: 10/537,167

(22) PCT Filed: Mar. 2, 2004

(86) PCT No.: PCT/JP2004/002536

§ 371 (c)(1),
(2), (4) Date: Jun. 1, 2005

(87) PCT Pub. No.: WO2004/079177

PCT Pub. Date: Sep. 16, 2004

(65) Prior Publication Data

US 2006/0070597 A1    Apr. 6, 2006

(30) Foreign Application Priority Data

Mar. 3, 2003  (JP) .............................. 2003-055218
Jul. 30, 2003  (JP) .............................. 2003-283248

(51) Int. Cl.
*F02F 3/00*  (2006.01)
(52) U.S. Cl. .................. 123/193.6; 123/193.4
(58) Field of Classification Search ............ 123/193.1, 123/193.2, 193.4, 193.6, 54 R, 78 BA, 48 B, 123/47 R; 92/85 R, 143, 181, 182, 185, 238
See application file for complete search history.

(56) References Cited

U.S. PATENT DOCUMENTS 5,050,485 A * 9/1991 Hoult .......................... 92/126
5,054,375 A * 10/1991 Kawabata et al. ............. 92/126
5,265,565 A * 11/1993 Bando ..................... 123/193.4

FOREIGN PATENT DOCUMENTS

| JP | 62-026346 | 2/1987 |
| JP | 04-159441 | 6/1992 |
| JP | 04-321757 | 11/1992 |
| JP | 04-347353 | 12/1992 |
| JP | 04-362258 | 12/1992 |
| JP | 05-005459 | 1/1993 |
| JP | 05-033865 | 2/1993 |
| JP | 10-132076 | 5/1998 |
| JP | 2000-509460 | 7/2000 |

OTHER PUBLICATIONS

International Search Report for PCT/JP2004/002536 dated Jun. 29, 2004.

* cited by examiner

*Primary Examiner*—M. McMahon
(74) *Attorney, Agent, or Firm*—Nixon & Vanderhye P.C.

(57) ABSTRACT

A reciprocating engine comprises: a piston ring; a piston ring which defines an annular gas chamber in cooperation with the piston ring and which is adjacent to the piston ring such that a pressure-receiving area of a side surface of a piston in the annular gas chamber becomes greater on a thrust side than on a counter-thrust side of the piston; and gas passages for allowing the annular gas chamber to communicate with the combustion chamber.

13 Claims, 11 Drawing Sheets

RECIPROCATING ENGINE

This application is the US national phase of international application PCT/JP 2004/002536 filed 2 Mar. 2004, which designated the U.S. and claims benefit of JP 2003-055218 filed 3 Mar. 2003, and JP 2003-283248 filed 30 Jul. 2003, the entire contents of each of which are hereby incorporated by reference.

TECHNICAL FIELD

The present invention relates to a reciprocating engine for use in an automobile or the like.

BACKGROUND ART

As a reciprocating engine of this type, a reciprocating engine has been proposed in JP-A-5-180069 in which, in order to reduce sliding frictional resistance between a side surface of a piston and an inner surface of a cylinder which increases as a connecting rod is inclined in an explosion stroke (combustion stroke), a second piston ring (second ring) adjacent to a first piston ring (top ring) is inclined with respect to the first piston ring, and a combustion chamber and an annular gas chamber between the first and second piston rings are communicated through a gas passage. In such a reciprocating engine, the support of the piston (gas-pressure support) on the thrust side occurring on the basis of the gas pressure of the annular gas chamber is increased by tilting the second piston ring, so as to reduce the sliding frictional resistance between the inner surface of the cylinder, on the one hand, and the side surfaces of the piston rings and the side surface of the piston, on the other hand, due to the lateral pressure of the piston.

In addition, as another reciprocating engine of this type, a reciprocating engine has been proposed in JP-A-5-5459 in which, in order to reduce the sliding frictional resistance between the inner surface of the cylinder and the side surface of the piston in the reciprocating motion of the piston, a second piston ring (second ring) adjacent to a first piston ring (top ring) is inclined with respect to the first piston ring. In such a reciprocating engine, the lateral pressure on the thrust side occurring on the basis of combustion gases is increased by tilting the second piston ring, so as to reduce the thrust-side sliding frictional resistance between the inner surface of the cylinder, on the one hand, and the side surfaces of the piston rings and the side surface of the piston, on the other hand, which can increase on the basis of the gas pressure and the like of the combustion gases in the combustion chamber with respect to the piston.

Incidentally, in such a reciprocating engine, if the second piston ring is inclined to gas-pressure support the piston by generating gas pressure which resists the lateral pressure of the piston, the volume on the thrust side of the annular gas chamber defined by the first and second piston rings becomes greater than the volume on the counter-thrust side thereof. Therefore, a required amount of combustion gases in the combustion chamber cannot be speedily introduced into the annular gas chamber through a single gas passage. Hence, it is difficult to substantially reduce the sliding frictional resistance between the cylinder, on the one hand, and the piston rings and the side surface of the piston, on the other hand, by generating desired supporting force. In a case where the second piston ring is inclined greatly or in a case where the period of communication between the combustion chamber and the annular gas chamber per reciprocating motion becomes short due to the high-speed rotation of the reciprocating engine, it can become even more difficult to introduce a required amount of combustion gases in the combustion chamber speedily into the annular gas chamber.

In addition, with the above-described other reciprocating engine, if the second piston ring is inclined greatly so as to generate large lateral pressure on the thrust side, there is a possibility that the inclined second piston ring interferes with an oil ring. Accordingly, it is difficult to substantially reduce the sliding frictional resistance between the cylinder, on the one hand, and the piston rings and the side surface of the piston by generating desired lateral pressure.

The present invention has been devised in view of the above-described aspects, and its object is to provide a reciprocating engine which is capable of speedily introducing a necessary amount of gases in the combustion chamber into and causing it to act in the annular gas chamber with necessary force during a starting period of the fall of the piston in the explosion stroke and of generating a desired gas-pressure supporting force, thereby making it possible to substantially reduce the sliding frictional resistance between the cylinder, on the one hand, and the piston rings and the side surface of the piston, on the other hand.

Another object of the present invention is to provide a reciprocating engine which is capable of eliminating the interference of the piston ring with the oil ring and of generating the desire lateral pressure, thereby making it possible to substantially reduce the sliding frictional resistance between the cylinder, on the one hand, and the piston rings and the side surface of the piston, on the other hand.

DISCLOSURE OF THE INVENTION

The reciprocating engine in accordance with a first aspect of the invention comprises: a first piston ring adjacent to a top surface of a piston defining a combustion chamber; a second piston ring which defines an annular gas chamber in cooperation with the first piston ring and which is adjacent to the first piston ring such that a pressure-receiving area of a side surface of the piston in the annular gas chamber becomes greater on a thrust side than on a counter-thrust side; and a plurality of gas passages which are disposed in an inner surface of a cylinder in such a manner as to be juxtaposed in a circumferential direction of the inner surface of the cylinder and which allow the annular gas chamber to communicate with the combustion chamber on the thrust side.

According to the reciprocating engine in accordance with the first aspect, since the above-described construction is provided, a necessary amount of gases in the combustion chamber can be speedily introduced into and causing it to act in the annular gas chamber during a starting period of the fall of the piston in the explosion stroke, for example, through the plurality of gas passages which are disposed in the inner surface of the cylinder in such a manner as to be juxtaposed in the circumferential direction of the inner surface of the cylinder. A desired supporting force can be generated on the basis of the gas pressure within the annular gas chamber thus obtained so as to gas-pressure support the piston from the inner surface of the cylinder, thereby making it possible to substantially reduce the sliding frictional resistance between the cylinder, on the one hand, and the piston rings and the side surface of the piston, on the other hand.

Regarding the reciprocating engine in accordance with a second aspect of the invention, in the reciprocating engine in accordance with the first aspect, the plurality of gas passages respectively have recessed portions which are disposed in the inner surface of the cylinder at positions for allowing the annular gas chamber to communicate with the combustion chamber when the piston is at a top dead center or during a starting period of the fall from the top dead center.

According to the reciprocating engine in accordance with the second aspect, since the above-described construction is provided, the combustion gases can be forcibly introduced into and caused to act in the annular gas chamber extensively and uniformly through the plurality of recessed portions during the starting period of the fall of the piston from the top dead center in the explosion stroke, for example. Accordingly, it is possible to increase the gas pressure within the annular gas chamber, and the piston can be lowered (forwardly moved) while this gas pressure is being held. Particularly in the explosion stroke, the piston can be suitably gas-pressure supported in opposition to the lateral pressure of the piston.

Regarding the reciprocating engine in accordance with a third aspect of the invention, in the reciprocating engine in accordance with the second aspect, the plurality of recessed portions are adapted to allow only the annular gas chamber to respectively communicate with the combustion chamber.

Regarding the reciprocating engine in accordance with a fourth aspect of the invention, in the reciprocating engine in accordance with the second or third aspect, the plurality of gas passages are disposed in the inner surface of the cylinder at positions for allowing the annular gas chamber to communicate with the combustion chamber during the starting period of the fall of the piston from the top dead center.

Regarding the reciprocating engine in accordance with a fifth aspect of the invention, in the reciprocating engine in accordance with any one of the second to fourth aspects, at least one of the recessed portions is disposed in the inner surface of the cylinder at a position for allowing the annular gas chamber to communicate with the combustion chamber when the piston is positioned at the top dead center.

Regarding the reciprocating engine in accordance with a sixth aspect of the invention, in the reciprocating engine in accordance with any one of the second to fifth aspects, the at least one of the recessed portions is disposed in such a manner as to be located further away from a cylinder head than other ones of the recessed portions concerning a reciprocating direction.

According to the reciprocating engine in accordance with any one of the fourth to sixth aspects, since the above-described construction is provided, the combustion gases can be sufficiently introduced from the combustion chamber into the annular gas chamber over a long period of time.

Regarding the reciprocating engine in accordance with a seventh aspect of the invention, in the reciprocating engine in accordance with any one of the second to sixth aspects, the at least one of the recessed portions which is located most away from a counter-thrust-side portion of the piston is disposed further away from the cylinder head than the other ones of the recessed portions concerning the reciprocating direction.

Regarding the reciprocating engine in accordance with an eighth aspect of the invention, in the reciprocating engine in accordance with any one of the second to seventh aspects, a center portion of an opening plane of a space defined by the at least one of the recessed portions is disposed in such a manner as to oppose a center portion of the piston concerning a direction which is perpendicular to the reciprocating direction and an axial direction of a piston pin for coupling the piston and a connecting rod.

According to the reciprocating engine in accordance with the seventh or eighth aspect, since the above-described construction is provided, the combustion gases can be extensively introduced into and caused to act in the thrust-side portion of the annular gas chamber whose volume is greater than the counter-thrust-side portion of the annular gas chamber. Accordingly, the gas pressure within the annular gas chamber can be increased speedily.

Regarding the reciprocating engine in accordance with a ninth aspect of the invention, in the reciprocating engine in accordance with the sixth or seventh aspect, a portion located on a cylinder head side in a contiguous portion, which is contiguous to the cylinder inner surface of the recessed portion disposed further away from the cylinder head, is disposed closer to the cylinder head side than portions of contiguous portions contiguous to the cylinder inner surface in the other ones of the recessed portions and opposing in the reciprocating direction the portions thereof located on the cylinder head side.

Regarding the reciprocating engine in accordance-with a 10th aspect of the invention, in the reciprocating engine in accordance with any one of the second to ninth aspects, one portions of the opening planes of the spaces respectively defined by the plurality of recessed portions are respectively positioned on a line extending in a circumferential direction.

According to the reciprocating engine in accordance with the ninth or 10th aspect, since the above-described construction is provided, the combustion gases can be introduced into the annular gas chamber from the combustion chamber through the plurality of recessed portions and caused to act therein uniformly over a long period of time.

Regarding the reciprocating engine in accordance with an 11th aspect of the invention, in the reciprocating engine in accordance with any one of the second to 10th aspects, there are provided a pair of recessed portions opposing each other concerning the axial direction of the piston pin for coupling the piston and the connecting rod, and a distance from the cylinder head to one of the recessed portions in the reciprocating direction and a distance from the cylinder head to the other one of the recessed portions in the reciprocating direction are mutually equal.

According to the reciprocating engine in accordance with the 11th aspect, since the above-described construction is provided, the communication between the combustion chamber and the annular gas chamber through the pair of recessed portions can be started or terminated simultaneously. Thus, the compressed gases or combustion gases can be more speedily introduced into and caused to act in the annular gas chamber.

Regarding the reciprocating engine in accordance with a 12th aspect of the invention, in the reciprocating engine in accordance with any one of the second to 11th aspects, the plurality of recessed portions respectively have partially concave spherical surfaces.

According to the reciprocating engine in accordance with the 12th aspect, since the above-described construction is provided, resistance is not encountered in the influx of the combustion gases, and uniform and satisfactory introduction and action can be obtained.

Regarding the reciprocating engine in accordance with a 13th aspect of the invention, in the reciprocating engine in accordance with any one of the second to 12th aspects, an intersection angle between a line extending in the reciprocating direction and a tangential line to the contiguous portion contiguous to the cylinder inner surface in the at least one of the recessed portions is an obtuse angle.

Regarding the reciprocating engine in accordance with a 14th aspect of the invention, in the reciprocating engine in accordance with any one of the second to 13th aspects, tangential lines to both portions opposing each other in the reciprocating direction in the contiguous portion contiguous to the cylinder inner surface in the at least one of the recessed portions intersect each other at a position located further away from the piston than the both portions.

According to the reciprocating engine in accordance with the 13 or 14th aspect, since the above-described construction is provided, introduction and action of the combustion gases are effected extensively and uniformly.

Regarding the reciprocating engine in accordance with a 15th aspect of the invention, in the reciprocating engine in accordance with any one of the second to 12th aspects, a line extending in the reciprocating direction and a tangential line to the contiguous portion contiguous to the cylinder inner surface in the at least one of the recessed portions are perpendicular to each other.

Regarding the reciprocating engine in accordance with a 16th aspect of the invention, in the reciprocating engine in accordance with any one of the second to 15th aspects, the at least one of the recessed portions has a depth different from that of the recessed portion adjacent to that recessed portion in the circumferential direction.

Regarding the reciprocating engine in accordance with a 17th aspect of the invention, in the reciprocating engine in accordance with any one of the second to 16th aspects, the at least one of the recessed portions is deeper than the other ones of the recessed portions located on the counter-thrust side relative to the recessed portion concerning the direction which is perpendicular to the reciprocating direction and the axial direction of the piston pin for coupling the piston and the connecting rod.

Regarding the reciprocating engine in accordance with an 18th aspect of the invention, in the reciprocating engine in accordance with any one of the second to 17th aspects, the at least one of the recessed portions has a depth equal to that of the recessed portion adjacent to that recessed portion in the circumferential direction.

According to the reciprocating engine in accordance with any one of the 16th to 18th aspects, since the above-described construction is provided, the state of communication between the combustion chamber and the annular gas chamber through the recessed portions can be adjusted appropriately. Here, as the plurality of recessed portions are disposed in the inner surface of the cylinder by being respectively designed in connection with their curvatures and depths, it is possible to more satisfactorily adjust the state of communication between the combustion chamber and the annular gas chamber through the recessed portions.

Regarding the reciprocating engine in accordance with a 19th aspect of the invention, in the reciprocating engine in accordance with any one of the second to 18th aspects, there are provided a pair of recessed portions opposing each other concerning the axial direction of the piston pin for coupling the piston and the connecting rod, and an intersection angle between a line extending in the axial direction and a line connecting the center portion of the piston and the center portion of the opening plane of the space defined by the one of the recessed portions and an intersection angle between the line extending in the axial direction and a line connecting the center portion of the piston and the center portion of the opening plane of the space defined by the other one of the recessed portions are mutually equal.

Regarding the reciprocating engine in accordance with a 20th aspect of the invention, in the reciprocating engine in accordance with the 19th aspect, the pair of recessed portions have mutually similar shapes.

According to the reciprocating engine in accordance with the 19th or 20th aspect, since the above-described construction is provided, the combustion gases can be uniformly introduced into and caused to act in one side and the other side of the annular gas chamber concerning the axial direction of the coupling shaft.

Regarding the reciprocating engine in accordance with a 21st aspect of the invention, in the reciprocating engine in accordance with any one of the second to 20th aspects, an interval between the both portions opposing each other in the reciprocating direction in each of the contiguous portions of the plurality of recessed portions contiguous to the inner surface of the cylinder is greater than a thickness of the first piston ring.

Regarding the reciprocating engine in accordance with a 22nd aspect of the invention, in the reciprocating engine in accordance with any one of the second to 21st aspects, an interval between the both portions opposing each other in the reciprocating direction in each of the contiguous portions of the plurality of recessed portions contiguous to the inner surface of the cylinder is shorter than a distance in the reciprocating direction from a thrust-side portion of a defining surface of the first piston ring defining the annular gas chamber to a thrust-side portion of a defining surface of the second piston ring defining the annular gas chamber.

Regarding the reciprocating engine in accordance with a 23rd aspect of the invention, in the reciprocating engine in accordance with any one of the second to 22nd aspects, the opening plane of the space defined by the at least one of the recessed portions has a diameter different from the opening plane of the space defined by the other one of the recessed portions.

Regarding the reciprocating engine in accordance with a 24th aspect of the invention, in the reciprocating engine in accordance with any one of the second to 23rd aspects, the opening plane of the space defined by the at least one of the recessed portions has a diameter longer than the opening plane of the space defined by the recessed portion located closer to the counter-thrust side relative to the recessed portion concerning the reciprocating direction and the axial direction of the piston pin for coupling the piston and the connecting rod.

Regarding the reciprocating engine in accordance with a 25th aspect of the invention, in the reciprocating engine in accordance with any one of the second to 24th aspects, there are provided a pair of recessed portions opposing each other concerning the axial direction of the piston pin for coupling the piston and the connecting rod, and the diameter of the opening plane of the space defined by each of the pair of recessed portions and the diameter of the opening plane of the space defined by another recessed portion adjacent to the pair of recessed portions in the circumferential direction are mutually different.

Regarding the reciprocating engine in accordance with a 26th aspect of the invention, in the reciprocating engine in accordance with any one of the second to 25th aspects, the opening plane of the space defined by the at least one of the recessed portions has a diameter equal to that of the opening plane of the space defined by another one of the recessed portions.

According to the reciprocating engine in accordance with any one of the 23rd to 26th aspects, since the above-described construction is provided, the state of communication between the combustion chamber and the annular gas chamber through the recessed portions as well as the order of starting or termination of the communication can be adjusted appropriately.

Regarding the reciprocating engine in accordance with a 27th aspect of the invention, in the reciprocating engine in accordance with any one of the first to 26th aspects, the defining surface the first piston ring defining the annular gas chamber is disposed so as to be parallel to a plane perpendicular to the reciprocating direction.

Regarding the reciprocating engine in accordance with a 28th aspect of the invention, in the reciprocating engine in accordance with any one of the second to 27th aspects, the diameter of the opening plane of the space defined by the at least one of the recessed portions is greater than a depth of that recessed portion.

Regarding the reciprocating engine in accordance with a 29th aspect of the invention, in the reciprocating engine in accordance with any one of the first to 28th aspects, the piston ring is disposed in such a manner as to be inclined with respect to the reciprocating direction.

Regarding the reciprocating engine in accordance with a 30th aspect of the invention, the reciprocating engine in accordance with any one of the first to 29th aspects further comprises an oil ring disposed on the piston in face-to-face relation to the first piston ring with the second piston ring located therebetween, and a thrust-side portion of the oil ring is located further away from the first piston ring than a portion of the oil ring opposing the piston pin for coupling the piston and the connecting rod concerning the reciprocating direction.

According to the reciprocating engine in accordance with the 30th aspect, since the above-described construction is provided, the oil ring can be disposed by being spaced away from the first piston ring without interfering with the coupling shaft for coupling the piston and the connecting rod, and the second piston ring can be disposed by being spaced away from the first piston ring particularly on the thrust side without interfering with the oil ring. Here, with the reciprocating engine, even in a case where the second piston ring together with the oil ring is inclined greatly with respect to the reciprocating direction, the combustion gases in an amount sufficient to gas float the piston can be thoroughly and speedily introduced into and caused to act in the annular gas chamber from the combustion chamber through the above-described plurality of gas passages.

Regarding the reciprocating engine in accordance with a 31st aspect of the invention, in the reciprocating engine in accordance with the 30th aspect, the thrust-side portion of the oil ring is located further away from the first piston ring than a counter-thrust-side portion of the oil ring.

Regarding the reciprocating engine in accordance with a 32nd aspect of the invention, the reciprocating engine in accordance with the 29th aspect further comprises an oil ring disposed on the piston in face-to-face relation to the first piston ring with the second piston ring located therebetween, and the oil ring is disposed in such a manner as to be inclined with respect to the reciprocating direction.

Regarding the reciprocating engine in accordance with a 33rd aspect of the invention, in the reciprocating engine in accordance with the 32nd aspect, the oil ring and the second piston ring are disposed in such a manner as to be inclined with respect to the reciprocating direction with mutually equal angles.

Regarding the reciprocating engine in accordance with a 34th aspect of the invention, in the reciprocating engine in accordance with any one of the first to 33rd aspects, the piston pin for coupling the piston and the connecting rod are off-centered toward the counter-thrust side.

The reciprocating engine in accordance with a 35th aspect of the invention comprises: a first piston ring adjacent to a top surface of a piston defining a combustion chamber; a second piston ring which defines an annular gas chamber in cooperation with the first piston ring and which is adjacent to the first piston ring such that a pressure-receiving area of a side surface of the piston in the annular gas chamber becomes greater on another swinging side surface portion opposing one swinging side surface portion of the piston than on the one swinging side surface portion; an oil ring which is located further away from the first piston ring on the other swinging side surface portion side than on a substantially intermediate portion side between the one swinging side surface portion and the other swinging side surface portion; and a gas passage formed in at least one of the piston and an inner surface of a cylinder and adapted to allow the annular gas chamber to communicate with the combustion chamber.

According to the reciprocating engine in accordance with the 35th aspect, since the above-described construction is provided, the oil ring can be disposed by being spaced away from the first piston ring without interfering with the coupling shaft for coupling the piston and the connecting rod, and the second piston ring can be disposed by being spaced away from the first piston ring particularly on the other swinging side surface portion side without interfering with the oil ring. Thus, the piston can be floated up (gas floated) from the inner surface of the cylinder by generating desired lateral pressure, thereby making it possible to substantially reduce the sliding frictional resistance between the cylinder and the piston rings.

Regarding the reciprocating engine in accordance with a 36th aspect of the invention, in the reciprocating engine in accordance with the 35th aspect, the second piston ring is disposed in such a manner as to be inclined with respect to a reciprocating direction of the piston.

Regarding the reciprocating engine in accordance with a 37th aspect of the invention, in the reciprocating engine in accordance with the 35th or 36th aspect, the oil ring is disposed in such a manner as to be inclined with respect to a reciprocating direction of the piston.

Regarding the reciprocating engine in accordance with an 38th aspect of the invention, in the reciprocating engine in accordance with any one of the 35th to 37th aspects, the one swinging side surface portion is located on a counter-thrust side, and the other swinging side surface portion is located on a thrust side.

According to the reciprocating engine in accordance with the 38th aspect, since the above-described construction is provided, it is possible to substantially reduce the sliding frictional resistance between the cylinder and the piston rings on the thrust side which can occur greatly in the combustion stroke, thereby allowing the piston to reciprocate smoothly.

Regarding the reciprocating engine in accordance with a 39th aspect of the invention, in the reciprocating engine in accordance with any one of the 35th to 38th aspects, the gas passage is constituted by a recessed portion which is disposed in the inner surface of the cylinder at a position for allowing the annular gas chamber to communicate with the combustion chamber when the piston is positioned at a top dead center.

The reciprocating engine in accordance with the above-described aspects may be a four-cycle gasoline engine or a diesel engine, and either engine is capable of suitably demonstrating the advantages based on the present invention.

According to the present invention, it is possible to provide a reciprocating engine which is capable of speedily introducing a necessary amount of gases in the combustion chamber into and causing it to act in the annular gas chamber with necessary force during a starting period of the fall of the piston in the explosion stroke and of generating a desired gas-pressure supporting force, thereby making it possible to substantially reduce the sliding frictional resistance between the cylinder, on the one hand, and the piston rings and the side surface of the piston, on the other hand.

In addition, according to the present invention, it is possible to provide a reciprocating engine which is capable of eliminating the interference of the piston ring with the oil ring and of generating the desire lateral pressure, thereby making it possible to substantially reduce the sliding frictional resistance between the cylinder, on the one hand, and the piston rings and the side surface of the piston, on the other hand.

Hereafter, a more detailed description will be given of the mode for carrying out the invention on the basis of the preferred embodiments illustrated in the drawings. It should be noted that the invention is not limited to these embodiments.

BEST MODE FOR CARRYING OUT THE INVENTION

Figure 1:
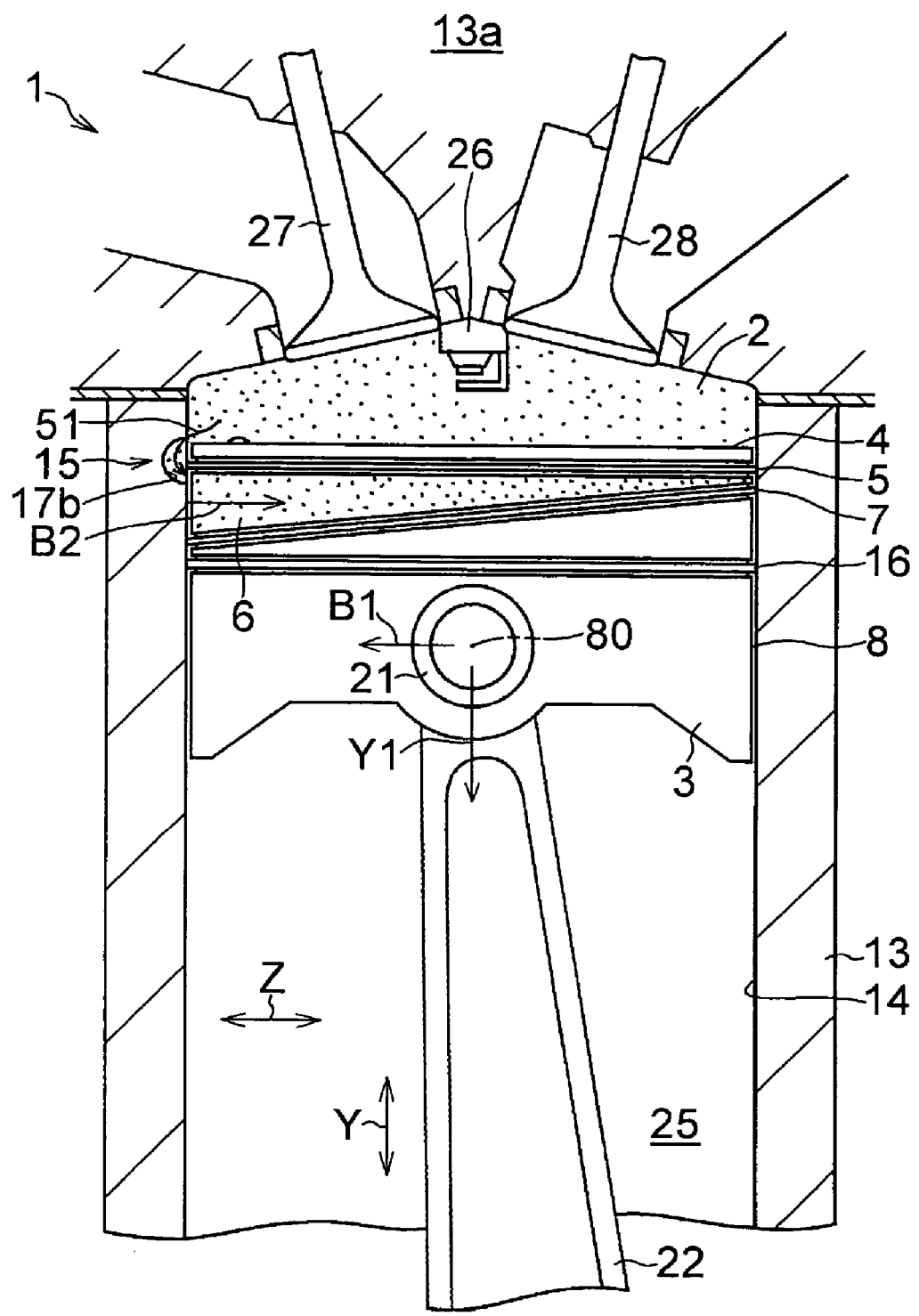
FIG. 1 is an explanatory vertical cross-sectional view of an embodiment of the invention.
Figure 2:
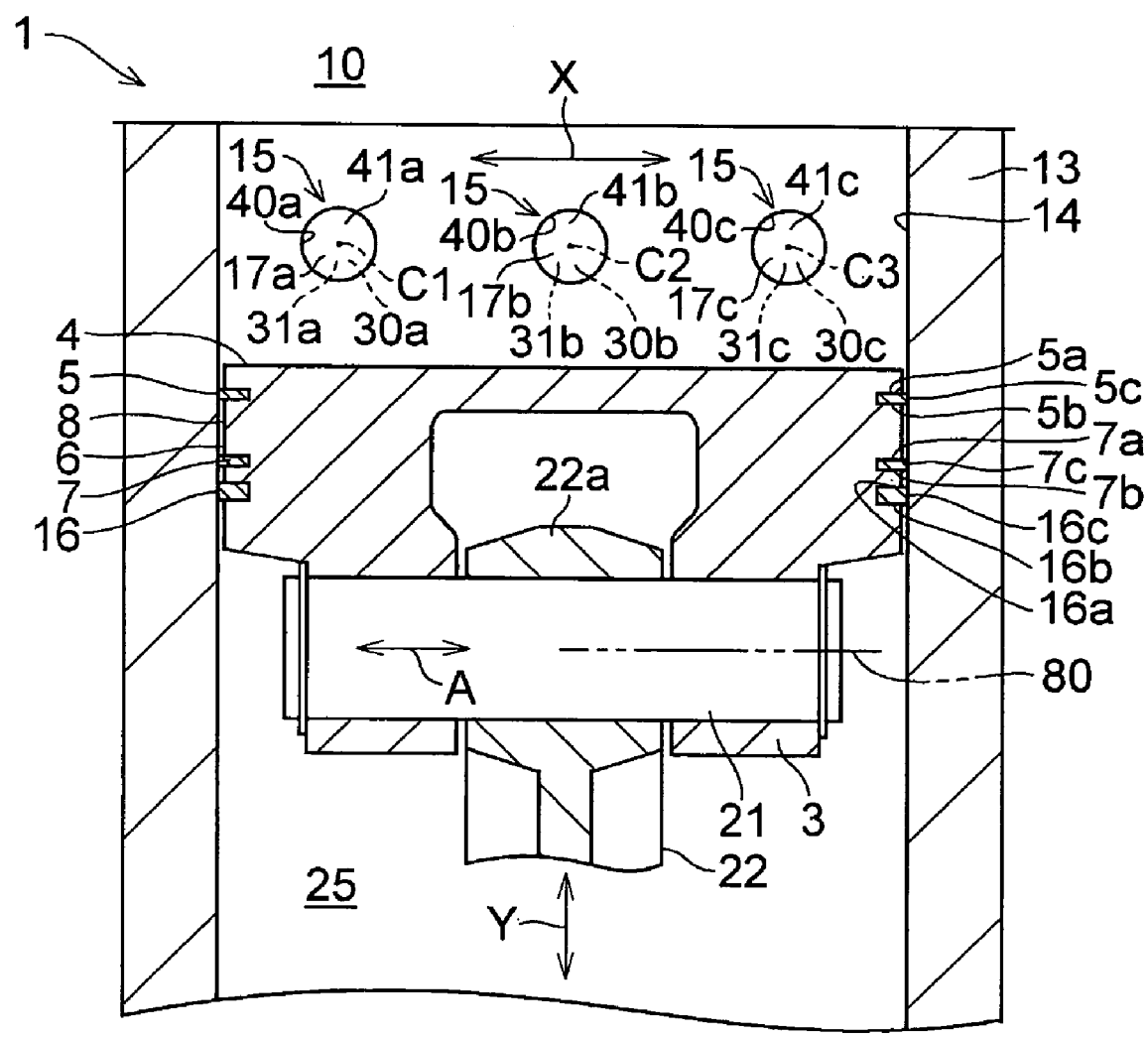
FIG. 2 is an explanatory cross-sectional view, taken along line II-II, of the embodiment shown in FIG. 7.

In FIGS. 1 to 8, a four-cycle gasoline engine 1 serving as a reciprocating engine in accordance with this embodiment is comprised of a piston ring (top ring) 5 adjacent to a top surface (head end face) 4 of a piston 3 defining a combustion chamber 2; a piston ring 7 which defines an annular gas chamber 6 in cooperation with the piston ring 5 and which is adjacent to the piston ring 5 such that the pressure-receiving area of a side surface 8 of the piston 3 in the annular gas chamber 6 becomes greater on a thrust side 10 than on a counter-thrust side 9 of the piston 3; a plurality of gas passages 15 which are disposed in an inner surface 14 of a cylinder 13 in such a manner as to be juxtaposed in a circumferential direction X of the inner surface 14 of the cylinder 13 and which allow the annular gas chamber 6 to communicate with the combustion chamber 2 on the thrust side 10; and an oil ring 16 disposed in such a manner as to oppose the piston ring 5 with the piston ring 7 located therebetween in a reciprocating direction Y of the piston 3.

Ring grooves, which are disposed in such a manner as to respectively correspond to the piston rings 5 and 7 and the oil ring 16, are formed in the side surface 8 contiguous to the top surface 4 of the piston 3. The piston rings 5 and 7 and the oil ring 16 are respectively fitted in the ring grooves. The top surface 4 is formed on the piston 3 so as to be parallel to a plane perpendicular to the reciprocating direction Y. The side surface 8 is formed on the piston 3 so as to be parallel to the reciprocating direction Y.

Figure 7:
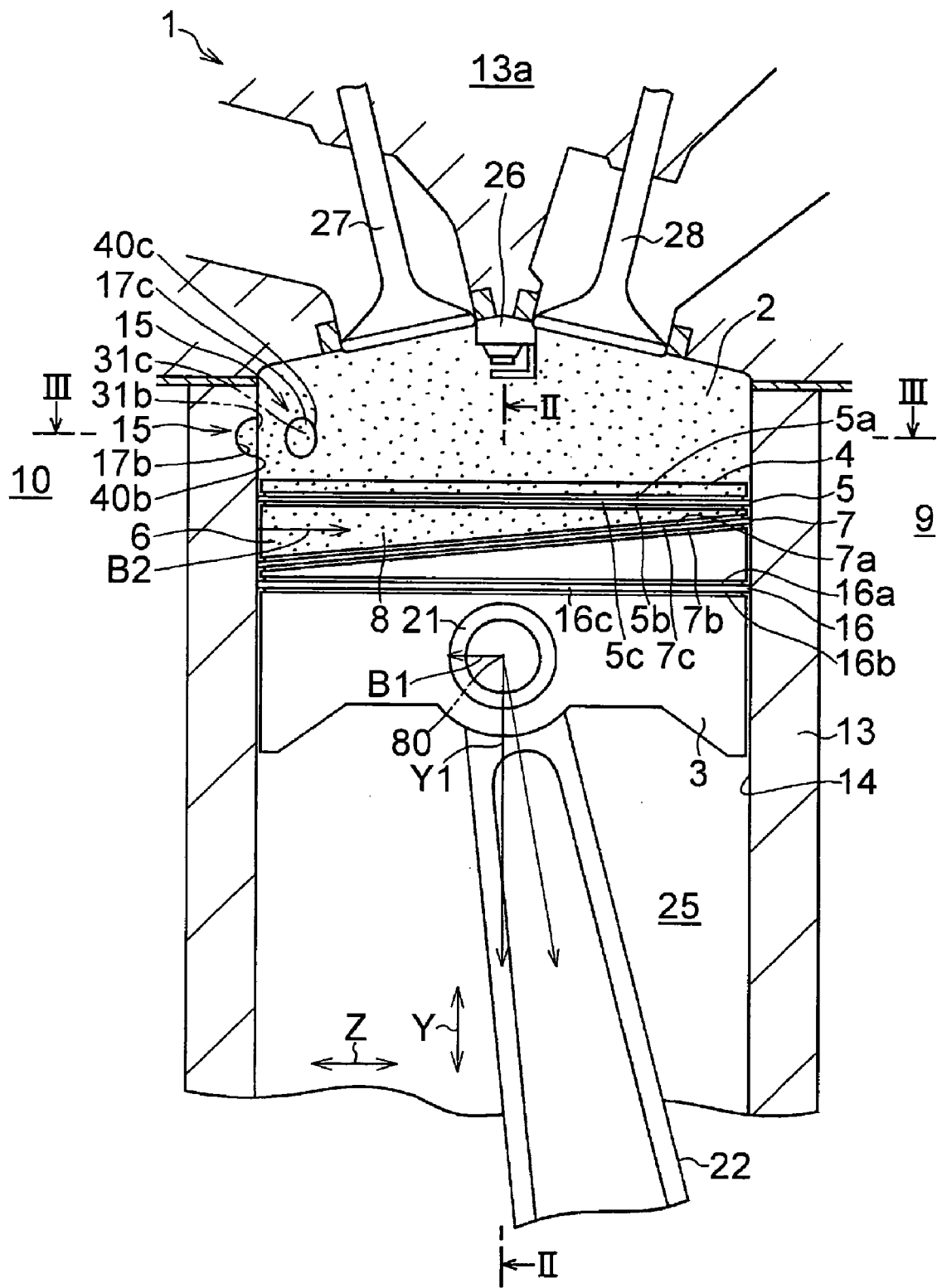
FIG. 7 is a diagram explaining the operation of the embodiment shown in FIG. 1.
Figure 8:
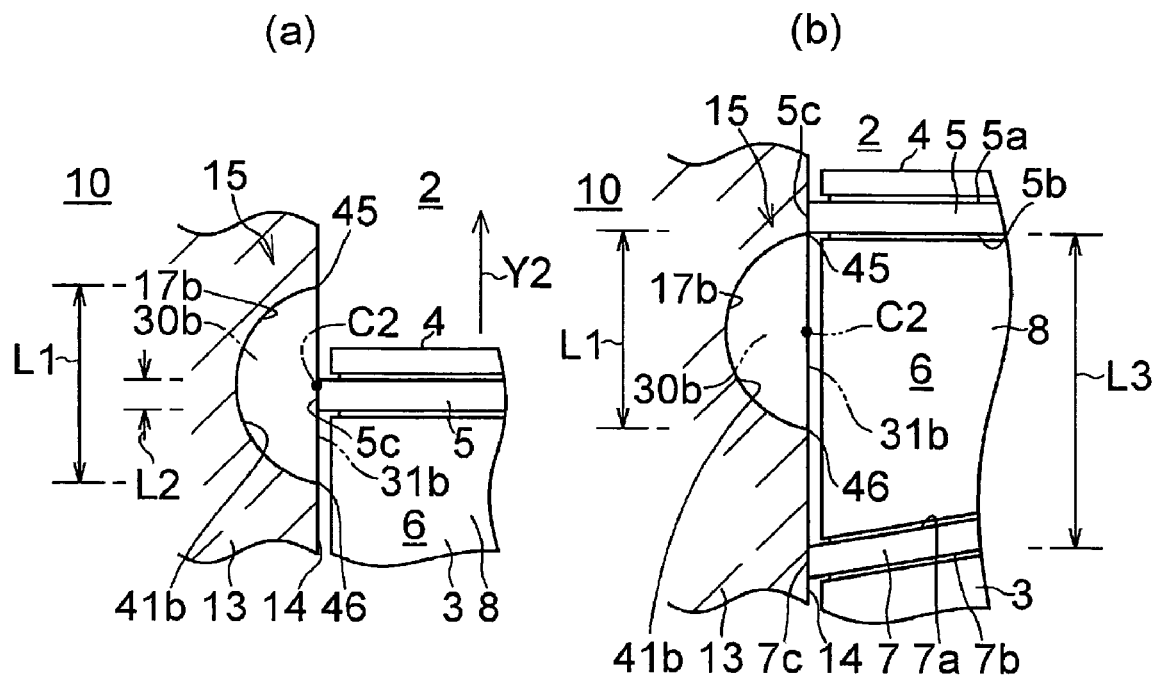
FIGS. 8(a), 8(b), and 8(c) are partially enlarged diagrams explaining the operation of the embodiment shown in FIG. 1.
Figure 8:
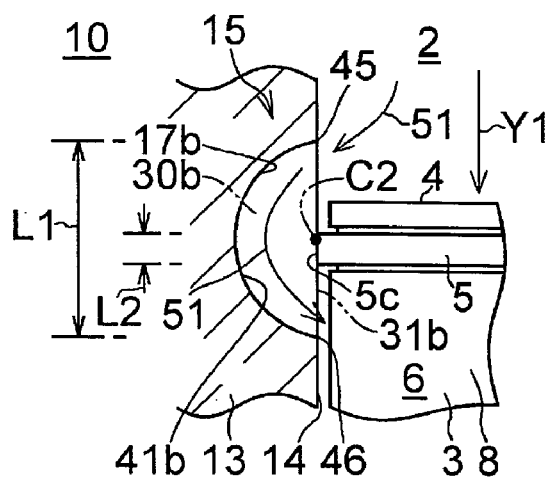

In this embodiment, a connecting rod 22, which has a small end portion 22a rotatably coupled to the piston 3 through a piston pin 21 and a large end portion to which a crankshaft is rotatably coupled, is arranged such that its large end portion is disposed more on the counter-thrust side than its small end portion 22a when the piston is reciprocated in a direction Y1, as shown in FIGS. 1 and 7.

The cylinder 13 has a cylinder bore (space) 25 defined by its inner surface 14, and the piston 3 is disposed in the cylinder bore 25 such that the piston 3 is reciprocatable in the reciprocating direction Y. A cylinder head 13a is provided with an ignition plug 26, an intake valve 27, and an exhaust valve 28. The inner surface 14 is formed in the cylinder 13 so as to be parallel to the reciprocating direction Y.

The piston ring 5 is fitted in the ring groove of the piston 3 such that the piston ring 5 is normally parallel to the top surface 4 of the piston 3 defining the combustion chamber 2. The piston ring 5 has an annular defining surface 5a defining the combustion chamber 2, an annular defining surface 5b defining the annular gas chamber 6, and a sliding side surface 5c which is contiguous to the annular defining surfaces 5a and 5b and slides on the inner surface 14 of the cylinder 13. The annular defining surfaces 5a and 5b are disposed so as to be parallel to a plane perpendicular to the reciprocating direction Y. The sliding side surface 5c is formed on the piston ring 5 so as to be parallel to the reciprocating direction Y. The piston ring 5 in this embodiment is formed with a thin wall so as to be able to define the combustion chamber 2 and the annular gas chamber 6.

The piston ring 7 is fitted in the ring groove of the piston 3 by being inclined with respect to the reciprocating direction Y so as to gradually move away from the piston ring 5 as viewed in the direction from the counter-thrust side 9 toward the thrust side 10. The piston ring 7 has an annular defining surface 7a disposed on the piston ring 5 side and defining the annular gas chamber 6, an annular surface 7b disposed on the oil ring 16 side and opposing the annular defining surface 7a, and a sliding side surface 7c which slides on the inner surface 14 of the cylinder 13. The annular defining surface 7a and the annular surface 7b are inclined with respect to the reciprocating direction Y so as to be located further away from the annular defining surface 5b on their portions on the thrust side 10 than on their portions on the counter-thrust side 9. The distance in the reciprocating direction Y from the portion of the annular defining surface 5b on the thrust side 10 to the portion of the annular defining surface 7a on the thrust side 10 is longer than the distance in the reciprocating direction Y from the portion of the annular defining surface 5b on the counter-thrust side 9 to the portion of the annular defining surface 7a on the counter-thrust side 9.

The annular gas chamber 6 is defined by the side surface 8 of the piston 3, the inner surface 14 of the cylinder 13, and the piston rings 5 and 7. Here, the volume of the annular gas chamber 6 is large on the thrust side 10 but is small on the counter-thrust side 9 since the piston ring 7 is disposed in an inclined manner, as described above.

The oil ring 16 in this embodiment is fitted in the ring groove of the piston 3 so as to be parallel to the piston ring (top ring) 5. The oil ring 16 has an annular surface 16a on the piston ring 7 side opposing the annular surface 7b, an annular surface 16b on the piston pin 21 side opposing the annular surface 16a in the reciprocating direction Y, and a sliding side surface 16c which is contiguous to the annular surfaces 16a and 16b and slides on the inner surface 14. The annular surfaces 16a and 16b in this embodiment are disposed so as to be parallel to the plane perpendicular to the reciprocating direction Y. The sliding side surface 16c is formed on the oil ring 16 so as to be parallel to the reciprocating direction Y.

In this embodiment, the inner surface 14 of the cylinder 13 is provided with three gas passage 15. The three gas passages 15 respectively have recessed portions 17a, 17b, and 17c which are disposed in the inner surface 14 of the cylinder 13 at positions for allowing the annular gas chamber 6 to communicate with the combustion chamber 2 when the piston 3 is positioned in the vicinity of the top dead center. The recessed portions 17a, 17b, and 17c in this embodiment are respectively formed in the inner surface 14 opposing the side surface 8 so as to respectively allow only the annular gas chamber 6 to communicate with the combustion chamber 2 simultaneously in a case where the piston 3 is present at a position corresponding to approximately 6 degrees to approximately 37 degrees in terms of the crank angle concerning the reciprocating direction Y.

The recessed portion 17b is disposed between the recessed portion 17a and 17c in the circumferential direction X, and the recessed portions 17a and 17c are opposed to each other in an axial direction A of the piston pin 21. The interval between the recessed portions 17a and 17b in the circumferential direction X and the interval between the recessed portions 17b and 17c in the circumferential direction X are substantially equal to each other. The recessed portions 17a, 17b, and 17c in this embodiment have shapes substantially similar to each other. In this embodiment, the distance in the reciprocating direction Y from the cylinder head 13a to the recessed portion 17a, the distance in the reciprocating direction Y from the cylinder head 13a to the recessed portion 17B, and the distance in the reciprocating direction Y from the cylinder head 13a to the recessed portion 17C are substantially equal to each other.

Figure 3:
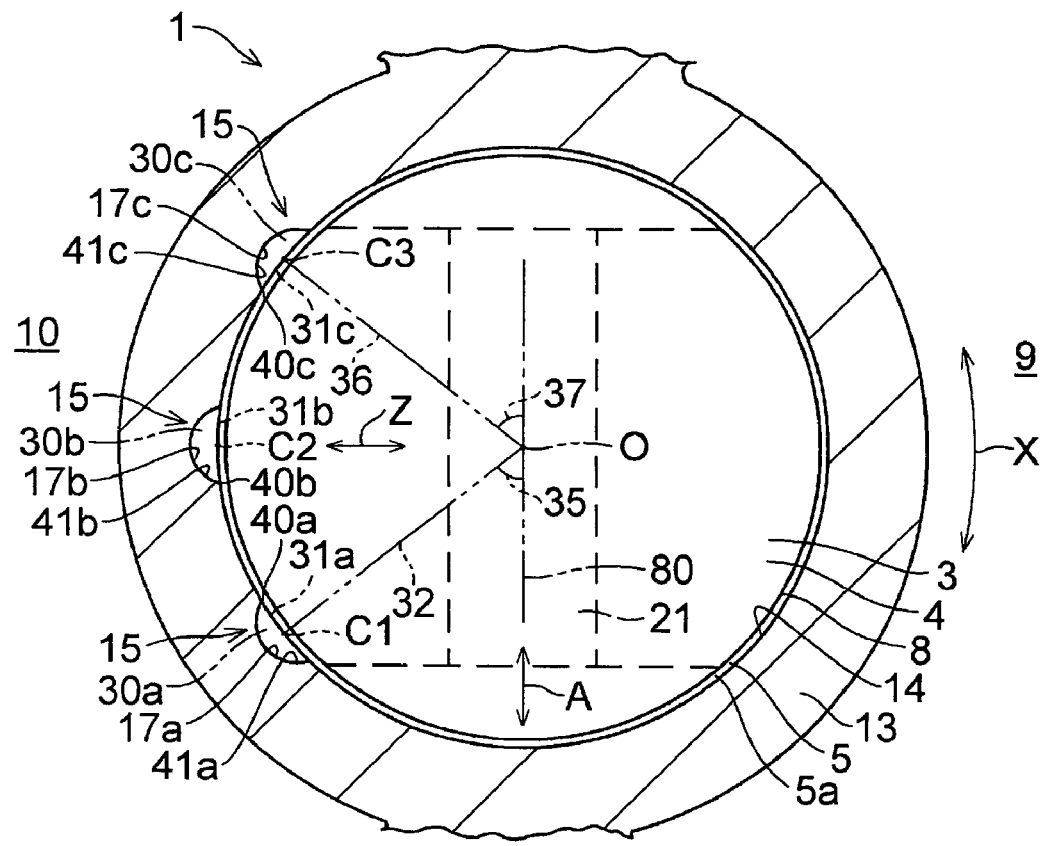
FIG. 3 is an explanatory cross-sectional view, taken along line III-III, of the embodiment shown in FIG. 7.

A center portion C2 of a circular opening plane 31b of a space 30b defined by the recessed portion 17b, in this example, is disposed in such a manner as to oppose a center portion O of the piston 3 concerning a direction Z which is perpendicular to the axial direction A and the reciprocating direction Y, as shown in FIG. 3. The recessed portion 17b is located further away from the counter-thrust side 9 than the recessed portions 17a and 17c.

An intersection angle 35 between a line 80 extending in the axial direction A and a line 32 connecting the center portion O of the piston 3 and a center portion C 1 of an opening plane 31a of a space 30a defined by the recessed portion 17a, and an intersection angle 37 between the line 80 and a line 36 connecting the center portion O of the piston 3 and a center portion C3 of an opening plane 31c of a space 30c defined by the recessed portion 17c, are substantially equal to each other.

The recessed portion 17a in this embodiment has a partially concave spherical surface 41a having a contiguous portion 40a contiguous to the inner surface 14 of the cylinder 13. The partially concave spherical surface 41a defines the space 30a having the circular opening plane 31a. The recessed portion 17b in this embodiment has a partially concave spherical surface 41b having a contiguous portion 40b contiguous to the inner surface 14 of the cylinder 13. The partially concave spherical surface 41b defines the space 30b having the circular opening plane 31b. The recessed portion 17c in this embodiment has a partially concave spherical surface 41c having a contiguous portion 40c contiguous to the inner surface 14 of the cylinder 13. The partially concave spherical surface 41c defines the space 30cb having the circular opening plane 31c. It should be noted that the recessed portions 17a, 17b, and 17c may respectively have angular surfaces instead of the partially concave spherical surfaces 41a, 41b, and 41c. Further, each of the contiguous portions 40a, 40b, and 40c may be provided with slight chamfering.

The partially concave spherical surfaces 41a, 41b, and 41c in this embodiment have mutually equal curvatures and depths in the direction perpendicular to the reciprocating direction Y. The circular opening planes 31a, 31b, and 31c in this embodiment have mutually equal diameters.

Figure 4:
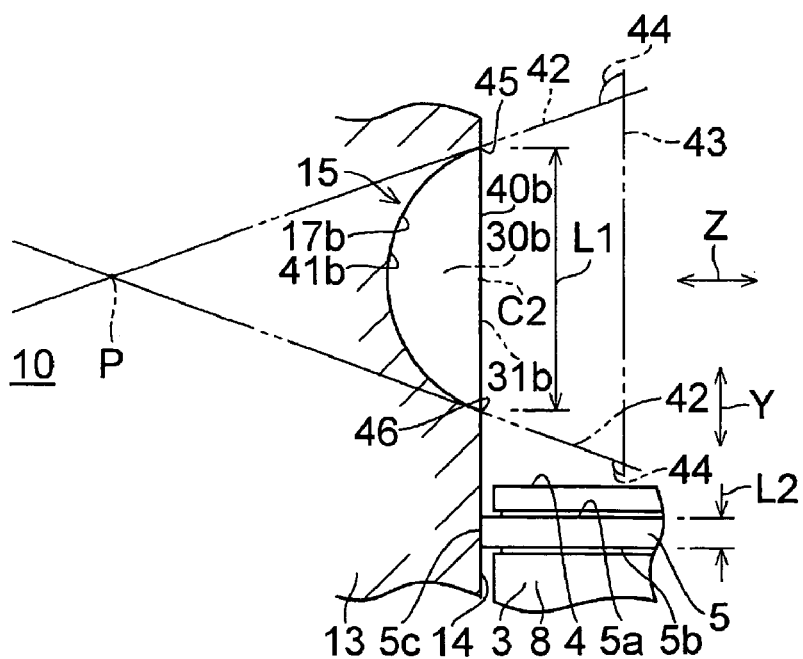
FIG. 4 is an explanatory enlarged vertical cross-sectional view mainly of a recessed portion of the embodiment shown in FIG. 1.
Figure 5:
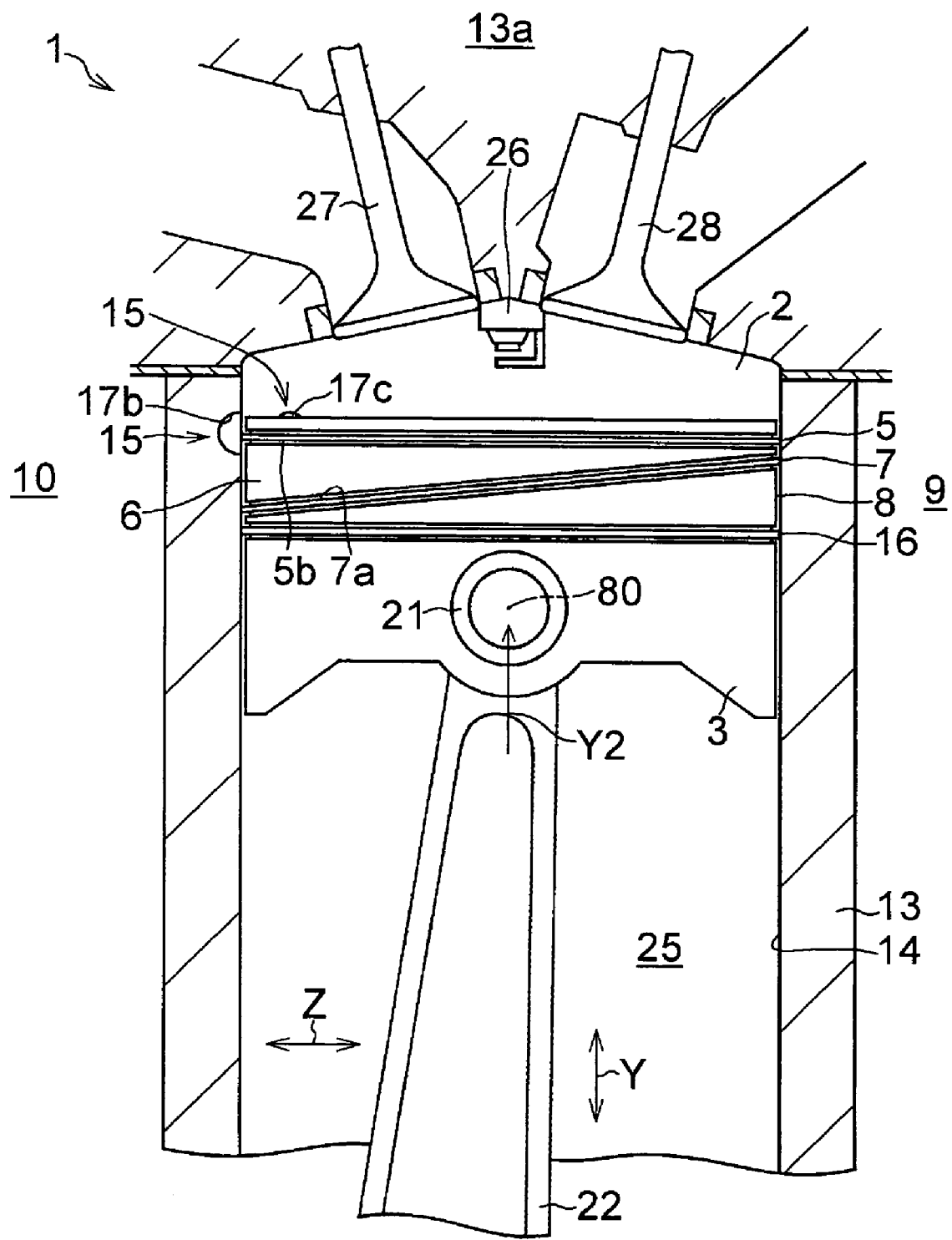
FIG. 5 is a diagram explaining the operation of the embodiment shown in FIG. 1.

The recessed portion 17b in this embodiment is provided in the inner surface 14 such that an intersection angle 44 between a tangential line 42 to the contiguous portion 40b and a line 43 extending in the reciprocating direction Y assumes an obtuse angle, as shown in FIG. 4. In this embodiment, the lines 42 tangential to portions 45 and 46 of the contiguous portion 40b opposing each other in the reciprocating direction Y intersect each other at a point of intersection P at a position located further away from the piston 3 than the portions 45 and 46 in the direction perpendicular to the reciprocating direction Y. The distance LI between the portions 45 and 46 in the reciprocating direction Y is longer than the distance L2 from the annular defining surface 5a to the annular defining surface 5b in the reciprocating direction Y. In other words, the interval between these portions 45 and 46 is greater than the thickness of the piston ring 5. As shown in FIG. 8(b), the distance Li is shorter than the distance L3 in the reciprocating direction Y from the portion on the thrust side 10 of the annular defining surface 5b to the portion on the thrust side 10 of the annular defining surface 7a. The diameter of the opening plane 31b of the space 30b defined by the recessed portion 17b is greater than the depth of that recessed portion 17b in the direction perpendicular to the reciprocating direction Y. It should be noted that, in this embodiment, since the contiguous portions 40a and 40c are constructed in the same way as the contiguous portion 40b, a detailed description thereof will be omitted.

To describe the operation of the reciprocating engine 1 in this embodiment, in the compression stroke, when the annular defining surface 5b of the piston ring 5 is positioned closer to the cylinder head 13a side than the portion 46 on the piston pin 21 side of the recessed portion 17b opposing the portion 45 on the cylinder head 13a side thereof while the piston 3 is positioned in the vicinity of the top dead center and before it reaches the top dead center, the combustion chamber 2 communicates with the annular gas chamber 6 through the recessed portion 17b, and low-pressure compressed gases start to enter the annular gas chamber 6 from the combustion chamber 2. Here, since the piston ring 5 is disposed so as to be parallel to the top surface 4, the combustion chamber 2 is communicated with the annular gas chamber 6 also through the spaces 30a and 30c defined by the recessed portions 17a and 17c juxtaposed to the recessed portion 17b in the circumferential direction X simultaneously with its communication with the annular gas chamber 6 through the space 30b. As a result, the low-pressure compressed gases enter the annular gas chamber 6 from the plurality of portions on the thrust side 10.

Figure 6:
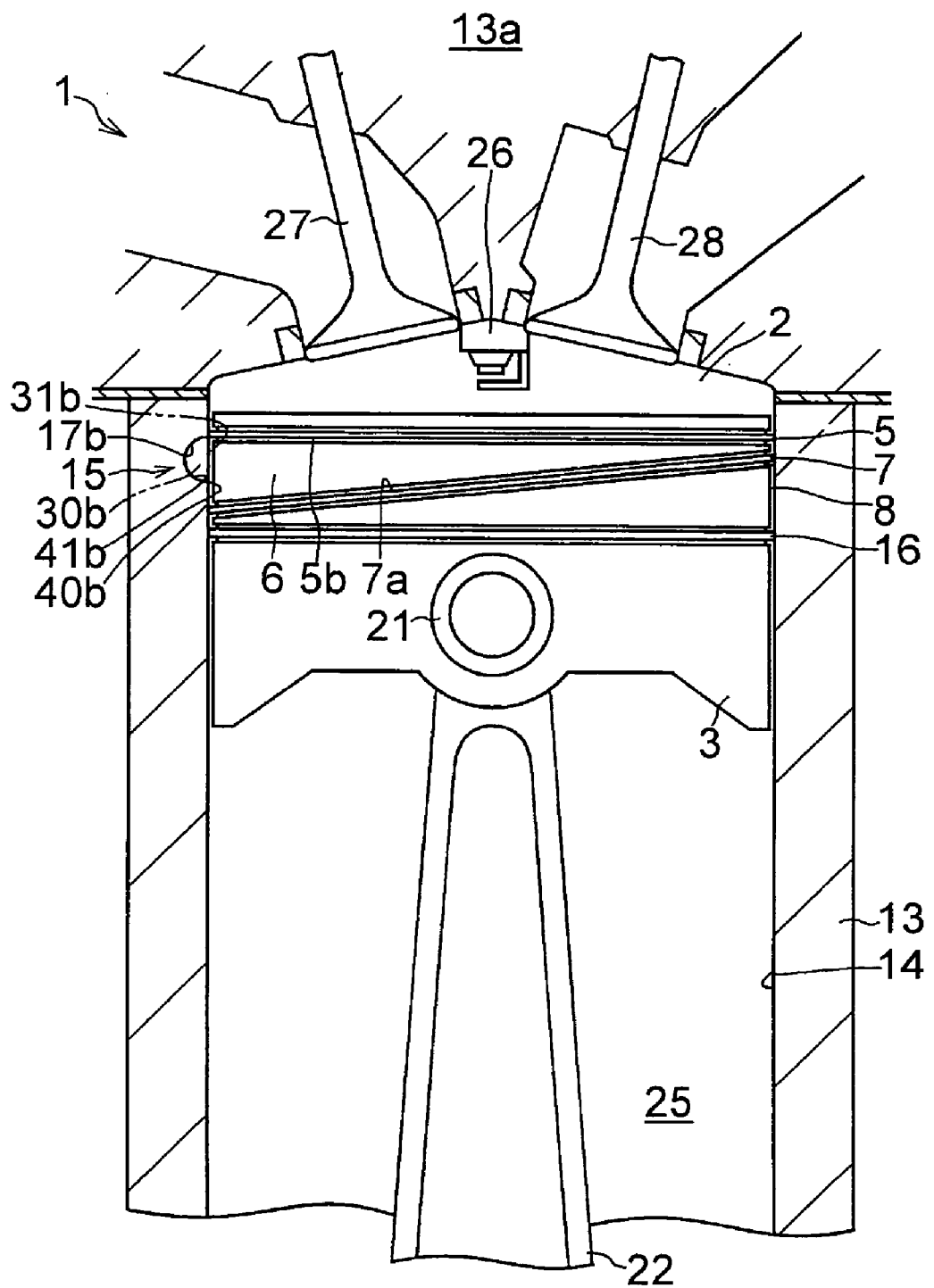
FIG. 6 is a diagram explaining the operation of the embodiment shown in FIG. 1.

Next, in the explosion stroke (combustion stroke) shown in FIGS. 1, 6, and 8(c), during the starting period of the fall of the piston 3, i.e., when the piston 3 falls in the vicinity of the top dead center, combustion gases 51 in the combustion chamber 2 are introduced into the annular gas chamber 6 through the recessed portions 17a, 17b, and 17c. The gas pressure within the annular gas chamber 6 is increased by the gas pressure of the introduced combustion gases 51, so that the piston 3 which is gas-pressure supported on the basis of that gas pressure falls toward the bottom dead center. Here, a forward moving force directed in the direction Y1 is imparted to the connecting rod 22 tilted with respect to the reciprocating direction Y from the piston 3 which is being moved forward while being gas-pressure supported by the gas pressure being held in the annular gas chamber 6. Consequently, a lateral pressure BI directed toward the thrust side 10 is imparted to the piston 3. However, in opposition to that lateral pressure B1, a supporting force B2 directed toward the counter-thrust side 9 is imparted to the piston 3 by the gas pressure supplied sufficiently to the interior of the annular gas chamber 6, thereby gas-pressure supporting the piston 3. It should be noted that in the case where the piston 3 is positioned at the top dead center, as shown in FIG. 6, the communication between the combustion chamber 2 and the annular gas chamber 6 through the recessed portions 17a, 17b, and 17c is stopped in this embodiment, as particularly shown in FIG. 8(b), but the communication may be allowed.

In the reciprocating engine 1 constructed as described above, since the piston 3 is brought to the position where the combustion chamber 2 and the annular gas chamber 6 are communicated through the recessed portions 17a, 17b, and 17c during the combustion, the gas pressure which is generated through combustion in the combustion chamber 2 in the combustion stroke is speedily introduced thoroughly into the annular gas chamber 6 through the recessed portions 17a, 17b, and 17c. Upon receiving the biased pressure within the annular gas chamber 6 on the basis of this introduced gas pressure, the piston 3 is gas-pressure supported at the inner surface 14, particularly at the portion on the thrust side 10 of the inner surface 14, in its reciprocating motion. The piston 3 which is supported by the gas pressure reciprocates with an extremely low sliding frictional resistance. In addition, in such reciprocating motion, although the piston 3 tends to be swung (oscillated) within the plane perpendicular to the axial direction A about the piston pin 21, this swinging motion is prevented by the aforementioned gas pressure of the annular gas chamber 6. The piston 3 can thus be reciprocated with an extremely low sliding frictional resistance, thereby making it possible to attain an improvement and the like of the fuel consumption of the reciprocating engine 1.

According to the reciprocating engine 1 of this embodiment, the reciprocating engine 1 is comprised of the piston ring 5 adjacent to the top surface 4 of the piston 3 defining the combustion chamber 2; the piston ring 7 which defines the annular gas chamber 6 in cooperation with the piston ring 5 and which is adjacent to the piston ring 5 such that the pressure-receiving area of the side surface 8 of the piston 3 in the annular gas chamber 6 becomes greater on the thrust side 10 than on the counter-thrust side 9; the plurality of gas passages 15 which are disposed in the inner surface 14 of the cylinder 13 in such a manner as to be juxtaposed in the circumferential direction X of the inner surface 14 of the cylinder 13 and which allow the annular gas chamber 6 to communicate with the combustion chamber 2 on the thrust side. Therefore, the combustion gases 51 in the combustion chamber 2 can be speedily introduced thoroughly into the annular gas chamber 6 through the plurality of gas passages 15. Hence, a desired supporting force can be generated on the basis of the combustion gases 51 in the annular gas chamber 6 thus introduced and caused to act, and the piston 3 is gas-pressure supported with respect to the inner surface 14. It is thereby possible to substantially reduce the sliding frictional resistance between the inner surface 14 of the cylinder 13, on the one hand, and the sliding side surface 5c of the piston ring 5 and the side surface 8 of the piston 3, on the other hand. Since the plurality of gas passages 15 respectively have the recessed portions 17a, 17b, and 17c which are disposed in the inner surface 14 at positions for allowing the annular gas chamber 6 to communicate with the combustion chamber 2 when the piston 3 is lowered in the vicinity of the top dead center, the combustion gases 51 can be forcibly introduced into and caused to act in the annular gas chamber 6 through the recessed portions 17a, 17b, and 17c in the vicinity of the top dead center. Furthermore, it is possible to increase the gas pressure within the annular gas chamber 6, and the piston 3 can be lowered (forwardly moved) while this gas pressure is being held. Particularly in the explosion stroke, the piston 3 can be suitably gas-pressure supported in opposition to the lateral pressure of the piston. Since the center portion C2 of the opening plane 31b of the space 30b defined by the recessed portion 17b is disposed in such a manner as to oppose the center portion O of the piston 3 concerning the direction Z, the compressed gases can be introduced preceding with the portion on the thrust side 10 of the annular gas chamber 6 whose volume is greater than the portion on the counter-thrust side 9 of the annular gas chamber 6. Accordingly, the combustion gases 51 can be speedily introduced more thoroughly into the annular gas chamber 6 and caused to act. Since the distance from the cylinder head 13a to the recessed portion 17a in the reciprocating direction Y and the distance from the cylinder head 13a to the recessed portion 17c are mutually equal, the communication between the combustion chamber 2 and the annular gas chamber 6 through the pair of recessed portions 17a and 17c can be started or terminated simultaneously and extensively. Thus, the combustion gases 51 can be more speedily and extensively introduced into and caused to act in the annular gas chamber 6. Since the recessed portions 17a, 17b, and 17c respectively have the partially concave spherical surfaces 41a, 41b, and 41c, resistance is not encountered in the influx of the combustion gases 51, and uniform and satisfactory introduction and action can be obtained. Further, the intersection angle 44 between the line 43 extending in the reciprocating direction Y and the tangential line 42 to the contiguous portion 40b of the partially concave spherical surface 41b contiguous to the inner surface 14 of the recessed portion 17b assumes an obtuse angle. Still further, the lines 42 tangential to the portions 45 and 46 of the contiguous portion 40b opposing each other in the reciprocating direction Y intersect each other at a position located further away from the piston 3 than the portions 45 and 45 in the direction perpendicular to the reciprocating direction Y. Furthermore, the recessed portions 17a and 17c are constructed in the same way as the recessed portion 17b. Therefore, the combustion gases 51 can be introduced extensively. The recessed portion 17b has a curvature which is mutually equal to the curvatures of the recessed portions 17a and 17c adjacent to that recessed portion 17b in the circumferential direction X. In addition, the recessed portion 17b has a depth equal to the depths of the recessed portions 17a and 17c adjacent to that recessed portion 17b in the circumferential direction X. Therefore, since the recessed portions 17a, 17b, and 17c are respectively designed in connection with their curvatures and depths and are disposed in the inner surface 14, the combustion chamber 2 and the annular gas chamber 6 can be communicated with each other by means of the recessed portions 17a, 17b, and 17c in a similar manner, respectively. The intersection angle 35 between the line 80 extending in the axial direction A and the line 32 connecting the center portion O of the piston 3 and the center portion C1 of the opening plane 31a of the space 30a defined by the recessed portion 17a, and the intersection angle 37 between the line 80 and the line 36 connecting the center portion O of the piston 3 and the center portion C3 of the opening plane 31c of the space 30c defined by the recessed portion 17c, are substantially equal to each other. Further, the recessed portions 17a and 17c have mutually identical shapes. Therefore, the combustion gases 51 can be introduced uniformly into one side and the other side of the combustion chamber 6 concerning the axial direction A. Since the opening plane 31b of the space 30b defined by the recessed portion 17b has a diameter substantially equal to the diameters of the opening planes 31a and 31c of the spaces 30a and 30c defined by the other recessed portions 17a and 17c, the combustion chamber 2 and the annular gas chamber 6 can be communicated in a similar state by the recessed portions 17a, 17b, and 17c, and the communication can be simultaneously started or terminated. Since the annular defining surface 5a is disposed so as to be parallel to the plane perpendicular to the reciprocating direction Y, and the annular defining surface 5b is disposed so as to be parallel to the plane perpendicular to the reciprocating direction Y, the communication between the combustion chamber 2 and the annular gas chamber 6 by the recessed portions 17a, 17b, and 17c, which are juxtaposed to each other in the circumferential direction, can be simultaneously started or terminated.

Figure 9:
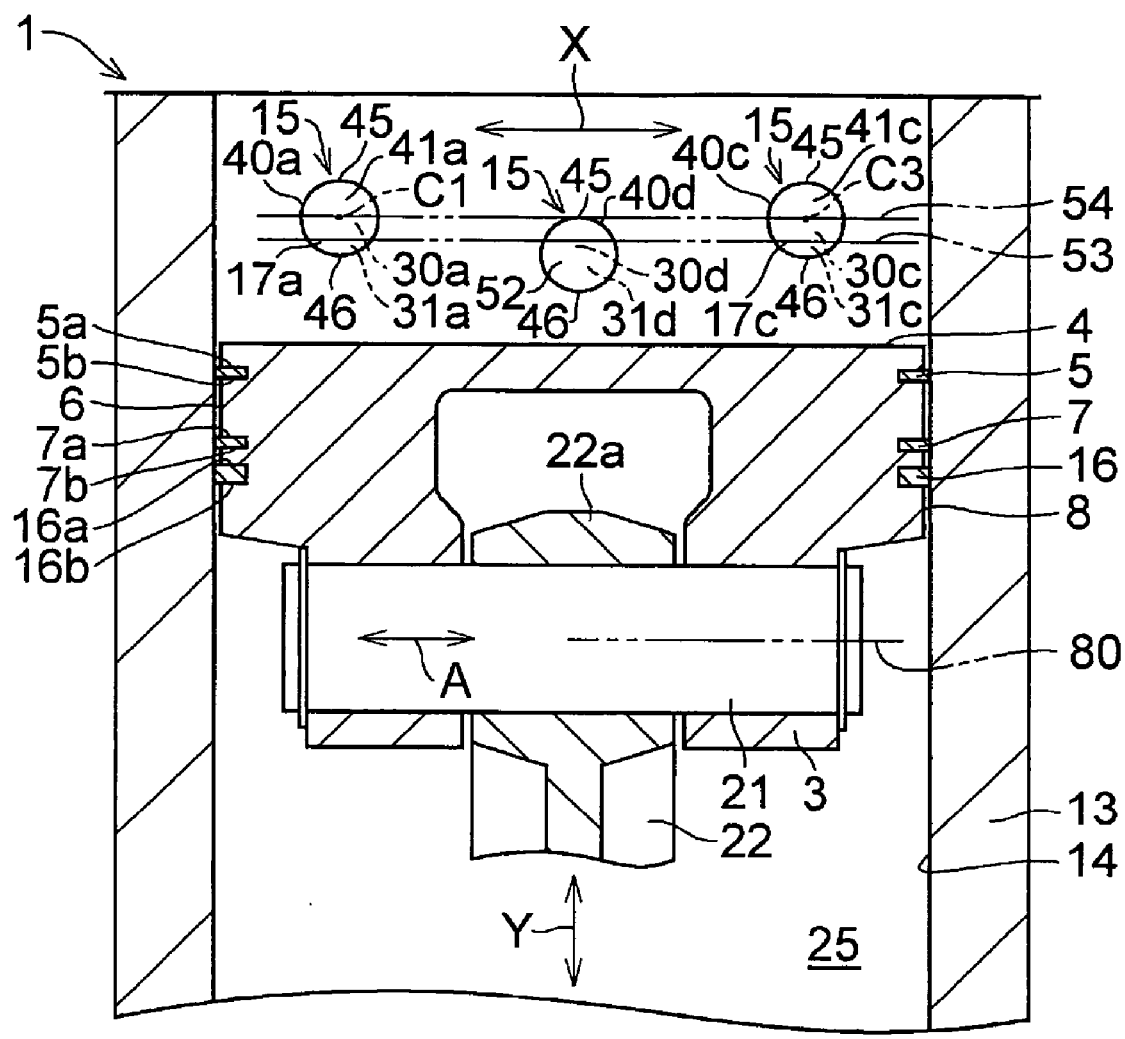
FIG. 9 is an explanatory diagram of another embodiment of the invention.

It should be noted that, as shown in FIG. 9, the reciprocating engine 1 of this embodiment may have, instead of the recessed portion 17b, for instance, a recessed portion 52 which is located most away from the portion on the counter-thrust side 9 of the piston 3 and is disposed further away from the cylinder head 13a than the other recessed portions 17a and 17c concerning the reciprocating direction Y. By virtue of such a recessed portion 52, the gases can be introduced from the portion on the thrust side 10 of the annular gas chamber 6 whose volume is greater than the portion on the counter-thrust side 9 of the annular gas chamber 6 in advance of the recessed portions 17a and 17c. Accordingly, the combustion gases 51 can be introduced more thoroughly and speedily into the annular gas chamber 6. It should be noted that the recessed portion 52 may be disposed in the inner surface 14 of the cylinder 13 by replacing at least one of the recessed portions 17a, 17b, and 17c or in addition to the recessed portions 17a, 17b, and 17c. By disposing such a recessed portion 52, the order in which the respective ones of the recessed portions 17a, 17b, 17c, and 52 allow the combustion chamber 2 and the annular gas chamber 6 to communicate with each other can be adjusted appropriately. Here, as shown in FIG. 9, the portion 45 located on the cylinder head 13a side in a contiguous portion 40d, which is contiguous to the inner surface 14 of the recessed portion 52 disposed further away from the cylinder head 13a in the reciprocating direction Y, may be disposed closer to the cylinder head 13a side than the portions 46 of the contiguous portions 40a and 40c opposing in the reciprocating direction Y the portions 45 thereof located on the cylinder head 13a side. Portions of the opening planes 31a, 31c, and 31d of the spaces 30a, 30c, and 30d respectively defined by the recessed portions 17a, 17b, and 17c may be respectively positioned on a line 53 extending the circumferential direction X. In addition, for example, the center portions C1 and C3 of the opening planes 31a and 31c of the recessed portions 17a and 17c may be positioned on a line 54 passing through the portion 45 of the contiguous portion 40d and extending in the circumferential direction X. In the case where the recessed portions 17a, 17c, and 52 are thus disposed, the combustion gases can be introduced continuously into the annular gas chamber 6 from the combustion chamber 2 without interruption by means of these recessed portions 17a, 17c, and 52.

Figure 10:
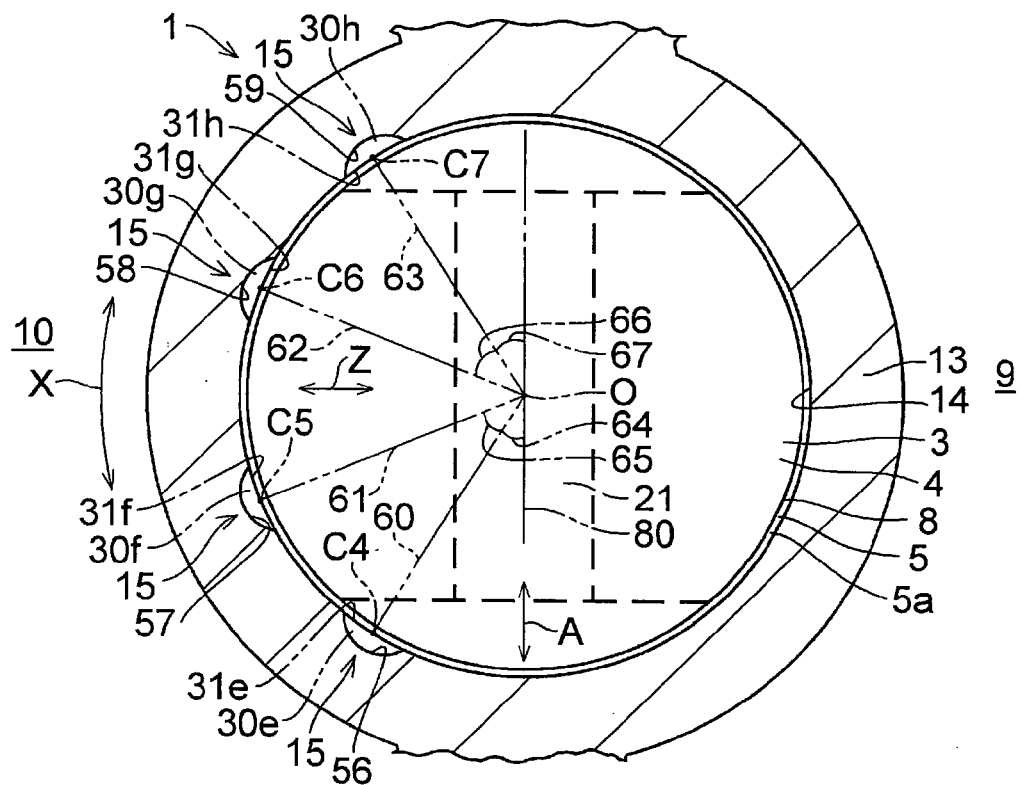
FIG. 10 is an explanatory diagram of still another embodiment of the invention.
Figure 11:
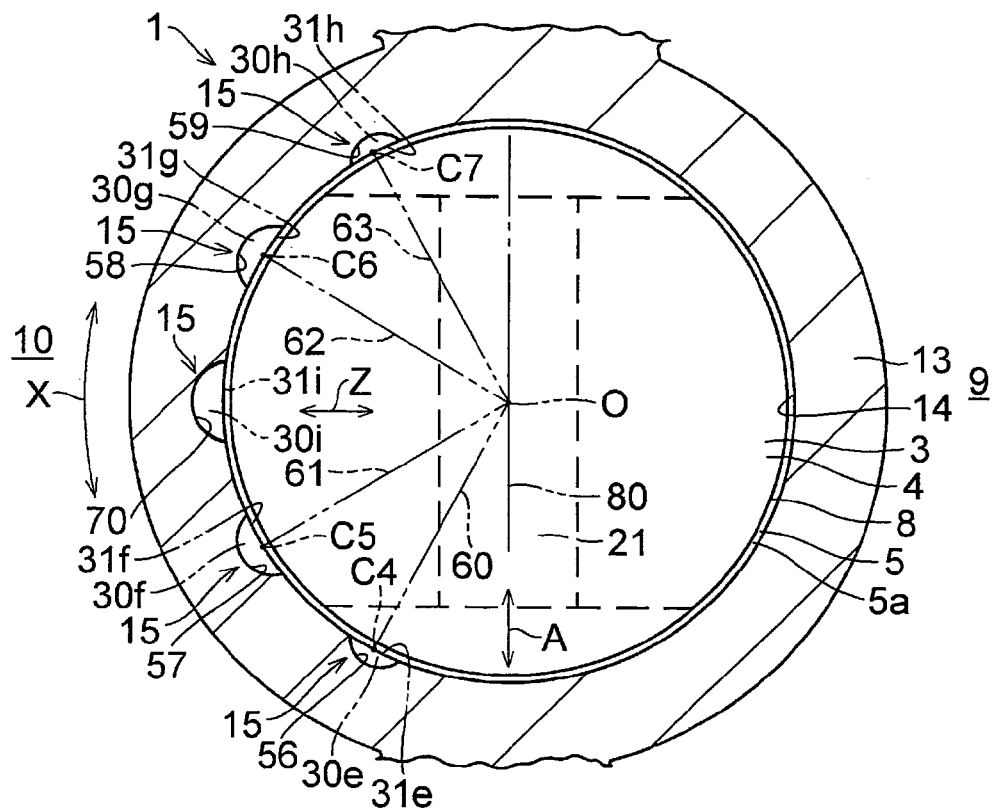
FIG. 11 is an explanatory diagram of a further embodiment of the invention.

In addition, the reciprocating engine 1 of this embodiment may have two gas passages 15 disposed in the inner surface 14 of the cylinder 13, instead of the three gas passages 15. Further, as shown in FIGS. 10 and 11, the reciprocating engine 1 of this embodiment may have more than three gas passages (four or five gas passages, etc.) 15. Thus, in correspondence with the various forms of the reciprocating engine 1, the number of the gas passages 15 can be set appropriately such that the combustion gases 51 can be introduced thoroughly, extensively, and speedily into the annular gas chamber 6. Here, in the case where, for instance, four gas passages 15 are provided, as shown in FIG. 10, an intersection angle 64 between the line 80 and a line 60 connecting the center portion O of the piston 3 and a center portion C4 of an opening plane 31e of a space 30e defined by a recessed portion 56, and an intersection angle 67 between the line 80 and a line 63 connecting the center portion O and a center portion C7 of an opening plane 31h of a space 30h defined by a recessed portion 59 opposing the recessed portion 56 in the axial direction A, are preferably substantially equal angles. Meanwhile, an intersection angle 65 between the line 80 and a line 61 connecting the center portion O and a center portion C5 of an opening plane 31f of a space 30f defined by a recessed portion 57 adjacent to the recessed portion 56 in the circumferential direction X, and an intersection angle 66 between the line 80 and a line 62 connecting the center portion O and a center portion C6 of an opening plane 31g of a space 30g defined by a recessed portion 58 opposing the recessed portion 57 in the axial direction A and adjacent to the recessed portion 59 in the circumferential direction X, are preferably substantially equal angles. In such a case, the combustion gases 51 can be uniformly introduced into and caused to act in the one side and the other side of the annular gas chamber 6 concerning the axial direction A.

Furthermore, instead of the recessed portions 17a, 17b, and 17c, the reciprocating engine 1 of this embodiment may have the recessed portions 56, 57, 58, and 59 whose depths in the direction perpendicular to the reciprocating direction Y are mutually different, as well as a recessed portion 70 opposing the center portion O of the piston 3 in the direction Z. Preferably, the recessed portion 70 located closest to the thrust side 10 is constructed so as to be deeper than the recessed portions 56, 57, 58, and 59 located on the counter-thrust side 9 relative to the recessed portion 70 concerning the direction Z, and the recessed portions 57 and 58 are constructed so as to be deeper than the recessed portions 56 and 59. In addition, the reciprocating engine 1 may have the recessed portions 56, 57, 58, and 59 whose curvatures are mutually different. Preferably, the recessed portion 70 located closest to the thrust side 10 has a smaller curvature than the recessed portions 56, 57, 58, and 59 located on the counter-thrust side 9 relative to that recessed portion 70 concerning the direction Z, and the recessed portions 57 and 58 have smaller curvatures than the recessed portions 56 and 59. Furthermore, the radii or diameters of the opening planes 31e, 31g, 31f, 31h, and 31i of the spaces 30e, 30f, 30g, 30h, and 30i respectively defined by the recessed portions 56, 57, 58, 59, and 70 may be mutually different. Preferably, the opening plane 31i in the recessed portion 70 located closest to the thrust side 10 has a longer radius or diameter than the opening planes 31e, 31f, 31g, and 31h, and 31i in the recessed portions 56, 57, 58, and 59 located on the counter-thrust side 9 relative to that recessed portion 70 concerning the direction Z. Meanwhile, the opening planes 31f and 31g in the recessed portions 57 and 58 have longer radii or diameters than the opening planes 31e and 31h in the recessed portions 56 and 59. By constructing the recessed portions 56, 57, 58, 59, and 70 respectively having the above-described depths, curvatures, and diameters (including radii and diameters), the state of communication between the combustion chamber 2 and the annular gas chamber 6 as well as the order of starting or termination of the communication can be adjusted appropriately. As the recessed portions 56, 57, 58, 59, and 70 are disposed in the inner surface 14 of the cylinder 13 by being respectively designed particularly in connection with the above-described curvatures and depths, it is possible to more satisfactorily adjust the state of communication between the combustion chamber 2 and the annular gas chamber 6 through the recessed portions 56, 57, 58, 59, and 70.

Figure 12:
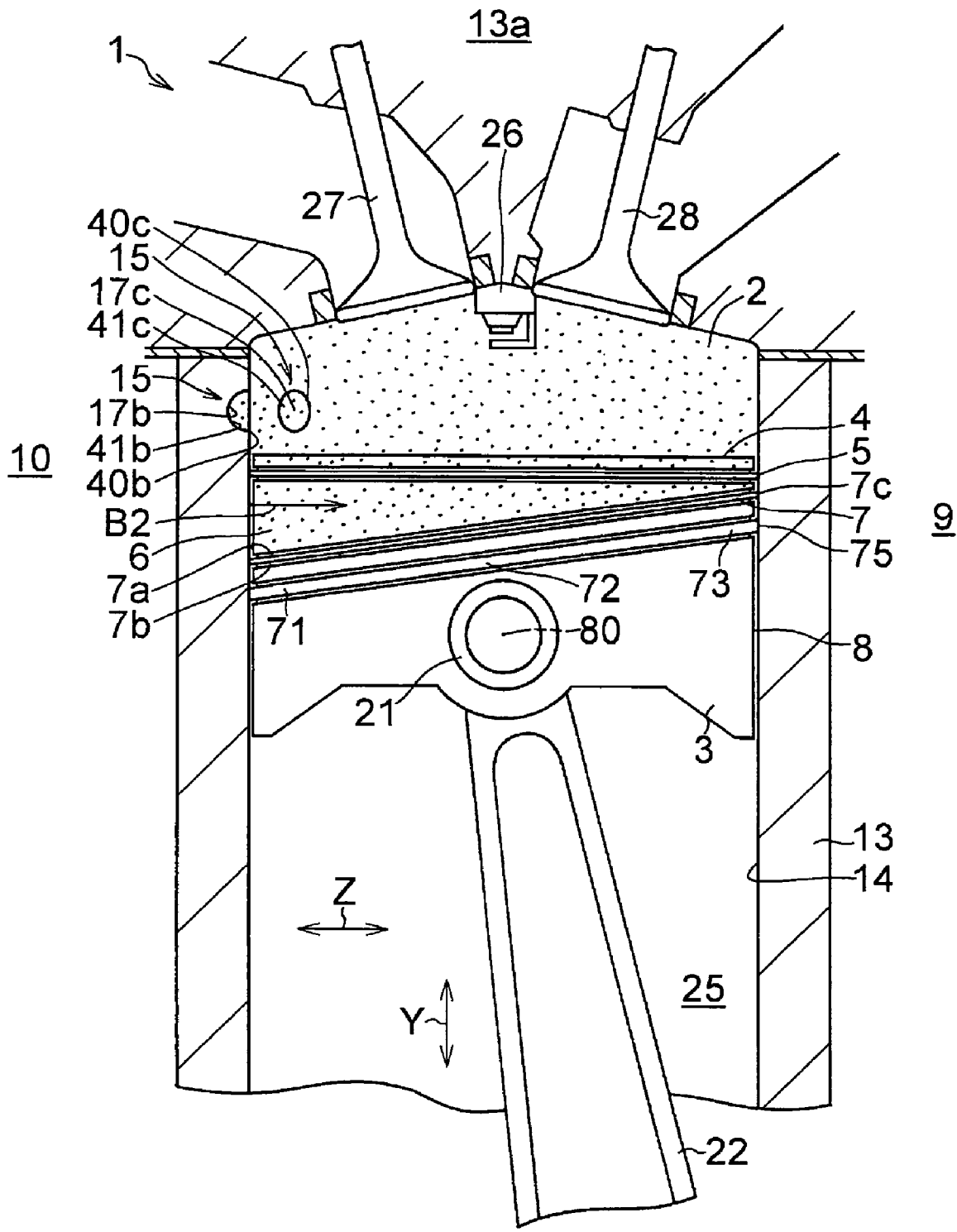
FIG. 12 is an explanatory vertical cross-sectional view of a still further embodiment of the invention.

Furthermore, as shown in FIG. 12, instead of the oil ring 16, the reciprocating engine 1 of this embodiment may have an oil ring 75 which is disposed on the piston 3 in face-to-face relation to the piston ring 5 with the piston ring 7 disposed therebetween, and which is inclined with respect to the reciprocating direction Y such that its portion 71 on the thrust side 10 is located further away from the piston ring 5 than its portion 72 opposing the piston pin 21 connecting the piston 3 and the connecting rod 22 and its portion 73 on the counter-thrust side 9 concerning the reciprocating direction Y. In such a case, the piston ring 7 may be inclined with respect to the reciprocating direction Y with an angle equal to the angle of inclination of the oil ring 75. According to the reciprocating engine 1 having the oil ring 75, the oil ring 75 can be disposed by being spaced away from the piston ring 5 without interfering with the piston pin 21, and the piston ring 7 can be disposed by being spaced away from the piston ring 5 particularly on the thrust side 10 without interfering with the oil ring 75. Here, with the reciprocating engine 1, even in a case where the piston ring 7 together with the oil ring 75 is inclined greatly with respect to the reciprocating direction Y, the combustion gases 51 in an amount sufficient to gas-pressure support the piston 3 can be thoroughly and speedily introduced into and caused to act in the annular gas chamber 6 from the combustion chamber 2 through the above-described plurality of gas passages 15, thereby increasing the gas pressure.

In addition, the reciprocating engine 1 of this embodiment may have a piston pin which is off-centered toward the counter-thrust side 9, instead of the piston pin 21.

It should be noted that, in this embodiment, the plurality of gas passages 15 respectively have the recessed portions 17a, 17b, and 17c which are disposed in the vicinities of the top dead center such that the communication between the combustion chamber 2 and the annular gas chamber 6 is temporarily canceled in the case where the piston 3 is positioned at the top dead center, as shown in FIG. 6. However, instead of at least one of the recessed portions 17a, 17b, and 17c or in addition thereto, the plurality of gas passages 15 may have a recessed portion or recessed portions which are disposed so as to allow the combustion chamber 2 and the annular gas chamber 6 to communicate also in the case where the piston 3 is positioned at the top dead center. Furthermore, instead of at least one of the recessed portions 17a, 17b, and 17c or in addition thereto, the plurality of gas passages 15 may have a recessed portion or recessed portions which are disposed in the inner surface of the cylinder 13 such that the line 43 extending in the reciprocating direction Y and the tangential lines 42 to the respective ones of the contiguous portions 40a, 40b, and 40c contiguous to the inner surface 14 of the cylinder 13.

Figure 13:
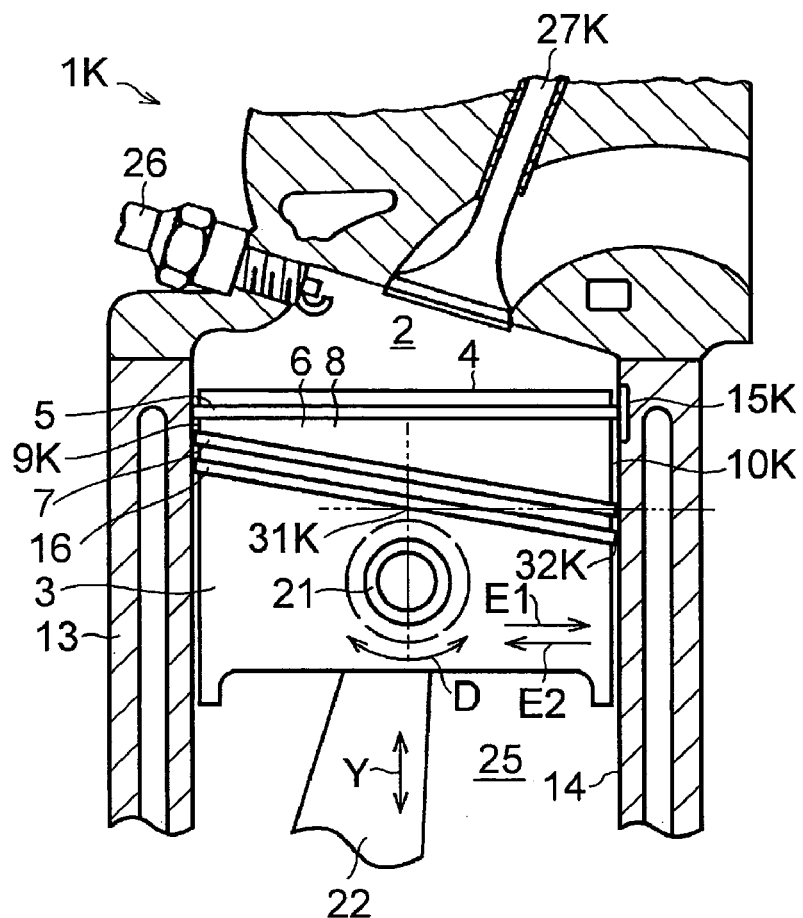
FIG. 13 is an explanatory vertical cross-sectional view of a further embodiment of the invention.
Figure 14:
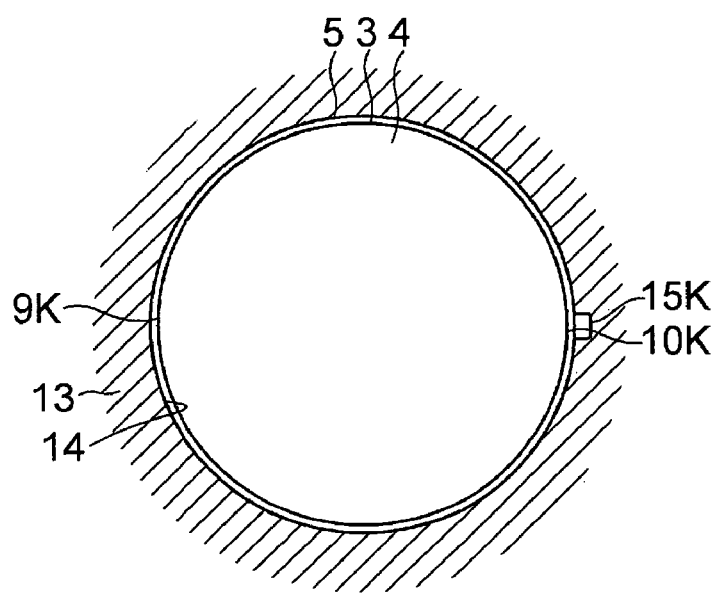
FIG. 14 is an explanatory partial plan view of the further embodiment shown in FIG. 13.

In FIGS. 13 and 14, another four-cycle gasoline engine 1K serving as the reciprocating engine of another embodiment is comprised of the piston ring (top ring) 5 adjacent to the top surface 4 of the piston 3 defining the combustion chamber 2; the piston ring (second ring) 7 which defines the annular gas chamber 6 in cooperation with the piston ring 5 and which is adjacent to the piston ring 5 such that the pressure-receiving area of the side surface 8 of the piston 3 in the annular gas chamber 6 becomes greater on a swinging side surface portion 10K, which is located on the thrust side and opposes a swinging side surface portion 9K located on the counter-thrust side 9 of the piston 3, than on the swinging side surface portion 9K; the oil ring 16 which is located further away from the piston ring 5 on the swinging side surface portion 10K side than on a substantially intermediate portion side between the swinging side surface portion 9K and the swinging side surface portion 10K; and a recessed portion 15K serving as a gas passage which is disposed in the inner surface 14 of the cylinder 13 and at a position for allowing the annular gas chamber 6 to communicate with the combustion chamber 2 when the piston 3 is positioned in the vicinity of the top dead center.

Ring grooves, which are disposed in such a manner as to respectively correspond to the piston rings 5 and 7 and the oil ring 16, are formed in the side surface 8 of the piston 3. The piston rings 5 and 7 and the oil ring 16 are respectively fitted in the ring grooves.

The connecting rod 22 is rotatably coupled at its small end portion to the piston 3 through a connecting shaft (piston pin) 21. A crankshaft is rotatably coupled to a large end portion of the connecting rod.

The cylinder 13 has the cylinder bore (space) 25 defined by its inner surface, and the piston 3 is disposed in the cylinder bore 25 such that the piston 3 is reciprocatable in the reciprocating direction Y. The cylinder 13 is provided with the ignition plug 26, an intake valve, and an exhaust valve 27K.

The piston ring 5 is fitted in the ring groove of the piston 3 such that the piston ring 5 is substantially parallel to the top surface (head end face) 4 of the piston 3 defining the combustion chamber 2.

The piston ring 7 is fitted in the ring groove of the piston 3 by being inclined with respect to the reciprocating direction Y and the piston ring 5 so as to be located gradually away from the piston 3 as viewed in the direction from the swinging side surface portion 9K toward the swinging side surface portion 10K. The distance from the piston ring 5 to the piston ring 7 on the swinging side surface portion 10K side is longer than the distance from the piston ring 5 to the piston ring 7 on the swinging side surface portion 9K side.

Abutment portions at respective both ends of the piston rings 5 and 7 are closely abutted or fitted so that the gases will not leak through the abutment portions at these both ends.

The annular gas chamber 6 is defined by the side surface 8 of the piston 3, the inner surface 14 of the cylinder 13, and the piston rings 5 and 7.

A portion 31K which is substantially intermediate between the swinging side surface portions 9K and 10K of the oil ring 16 is disposed in such a manner as to be spaced away from the piston ring 5 within a range in which it does not come into contact with the coupling shaft 21 in the reciprocating direction Y. A portion 32K located on the swinging side surface portion 10K side of the oil ring 16 is disposed in such a manner as to be further away from the piston ring 5 than the portion 31K in the reciprocating direction Y.

The recessed portion 15K is formed in the inner surface 14 facing the side surface 8 on the swinging side surface portion 10K side so as to allow the annular gas chamber 6 to communicate with the combustion chamber 2 in a case where the piston 3 is present at the position of the top dead center and at a position corresponding to approximately 15 degrees in terms of the crank angle.

A description will be given of the operation of the reciprocating engine 1K of this embodiment. In the combustion stroke of the air-fuel mixture which is started after completion of the compression stroke, ignition by the ignition plug 26 is effected while the piston 3 is positioned in the vicinity of the top dead center, and the combustion gases within the combustion chamber 2 are introduced into the annular gas chamber 6 through the recessed portion 15K. The piston 3 then receives the gas pressure of the combustion gases which heightened to a maximum while the piston 3 is being positioned in the vicinity of the top dead center after the passage of the top dead center of the piston 3, so that-the piston 3 accelerates toward the bottom dead center. Here, as a forward moving force is imparted from the forwardly moving piston 3 to the connecting rod 22 which is tilted with respect to the reciprocating direction Y, a lateral pressure E1 which is directed toward the thrust side is imparted to the piston 3. However, a counter lateral pressure E2 directed toward the counter-thrust side is imparted to the piston 3 by the gas pressure within the annular gas chamber 6, thereby causing the piston 3 to gas float.

In the reciprocating engine 1K constructed as described above, since the piston 3 is brought to the position where the combustion chamber 2 and the annular gas chamber 6 are communicated through the recessed portion 15K during the combustion, the gas pressure which is generated through combustion in the combustion chamber 2 in the combustion stroke is speedily introduced into the annular gas chamber 6 through the recessed portion 15K. Upon receiving the biased lateral pressure within the annular gas chamber 6 on the basis of this introduced gas pressure, the piston 3 floats up (gas floats) with respect to the inner surface 14, particularly the inner surface 14 on the swinging side surface portion 10K side, in its reciprocating motion. The piston 3 which is floated up by the gas pressure reciprocates with an extremely low sliding frictional resistance. In addition, in such reciprocating motion, although the piston 3 tends to be swung (oscillated) about the coupling shaft 21 in D directions, this swinging motion is prevented by the aforementioned biased lateral pressure of the annular gas chamber 6. The piston 3 can thus be reciprocated with an extremely low sliding frictional resistance without causing its side surface 8 on the swinging side surface portions 9K and 10K side to abut against the inner surface 14 of the cylinder 13, thereby making it possible to attain an improvement and the like of the fuel consumption of the reciprocating engine 1K.

According to the reciprocating engine 1K of this embodiment, the reciprocating engine 1 has the oil ring 16 which is located further away from the piston ring 5 on the swinging side surface portion 10K side than on a substantially intermediate portion side between the swinging side surface portion 9K and the swinging side surface portion 10K. Therefore, the oil ring 16 can be disposed such that the portion 31K of that oil ring 16 located above the coupling shaft 21 is located away from the piston ring 5 within a range in which it does not interfere with the coupling shaft 21, and such that the portion 32K of that oil ring 16 on the thrust side is located further way from the piston ring 5 than the portion 31K. Hence, the piston ring 7 can be inclined greatly with respect to the reciprocating direction Y without interfering with the oil ring 16, such that the aforementioned pressure-receiving area becomes greater on the swinging side surface portion 10K side than on the swinging side surface portion 9K side. Thus, the piston 3 can be floated up (gas floated) from the inner surface 14 of the cylinder 13 by generating desired lateral pressure, thereby making it possible to substantially reduce the sliding frictional resistance between the cylinder 13 and the piston rings 5 and 7.

It should be noted that although in the above-described embodiments, the reciprocating engine is implemented as the four-cycle gasoline engines 1 and 1K, the present invention is not limited to the same, and operational effects similar to those described above can be obtained if the present invention is implemented as a diesel engine, for example.

The invention claimed is:

1. A reciprocating engine comprising:
   a first piston ring adjacent to a top surface of a piston defining a combustion chamber;
   a second piston ring which defines an annular gas chamber in cooperation with said first piston ring and which is adjacent to said first piston ring such that a pressure-receiving area of a side surface of said piston in said annular gas chamber becomes greater on a thrust side than on a counter-thrust side; and
   a plurality of gas passages which are disposed in an inner surface of a cylinder in such a manner as to be juxtaposed in a circumferential direction of the inner surface of said cylinder and which allow said annular gas chamber to communicate with said combustion chamber on the thrust side,
   wherein said plurality of gas passages comprise a first recessed portion which is disposed in such a manner as to oppose a center portion of said piston concerning a direction which is perpendicular to both a reciprocating direction of said piston and an axial direction of a piston pin when said piston is at a top dead center or during a staring period of the fall from the top dead center, and a pair of second recessed portions, said first recessed portion being disposed between said pair of second recessed portions in said circumferential direction.

2. The reciprocating engine according to claim 1, wherein said plurality of gas passages are disposed in the inner surface of said cylinder at positions to allow said annular gas chamber to communicate with said combustion chamber when said piston is at the top dead center or during the starting period of the fall from the top dead center.

3. The reciprocating engine according to claim 2, wherein at least one of said recessed portions is adapted to allow only said annular gas chamber to communicate with said combustion chamber.

4. The reciprocating engine according to claim 2, wherein said plurality of gas passages are disposed in the inner surface of said cylinder at positions for allowing said annular gas chamber to communicate with said combustion chamber during the starting period of the fall of said piston from the top dead center.

5. The reciprocating engine according to claim 2, wherein at least one of said recessed portions is disposed in the inner surface of said cylinder at a position for allowing said annular gas chamber to communicate with said combustion chamber when said piston is positioned at the top dead center.

6. The reciprocating engine according to claim 2, wherein at least one of said recessed portions has a partially concave spherical surface.

7. The reciprocating engine according to claim 2, wherein said at least one of said recessed portions has a depth equal to that of said recessed portion adjacent to that recessed portion in the circumferential direction.

8. The reciprocating engine according to claim 6, wherein said pair of recessed portions have mutually similar shapes.

9. The reciprocating engine according to claim 2, wherein the opening plane of the space defined by said at least one of said recessed portions has a diameter different from the opening plane of said space defined by said other one of said recessed portions.

10. The reciprocating engine according to claim 2, wherein the opening plane of the space defined by said at least one of said recessed portions has a diameter equal to that of the opening plane of said space defined by another one of said recessed portions.

11. The reciprocating engine according to claim 1, wherein the defining surface of said first piston ring defining said annular gas chamber is disposed so as to be parallel to a plane perpendicular to the reciprocating direction.

12. The reciprocating engine according to claim 2, wherein the diameter of the opening plane of the space defined by said at least one of said recessed portions is greater than a depth of that recessed portion.

13. The reciprocating engine according to claim 1, wherein said piston pin for coupling said piston and said connecting rod are off-centered toward the counter-thrust side.

* * * * *